US007508302B2

(12) United States Patent
Watabe

(10) Patent No.: US 7,508,302 B2
(45) Date of Patent: Mar. 24, 2009

(54) WHEEL IDENTIFYING APPARATUS AND TIRE INFLATION PRESSURE DETECTING APPARATUS WITH FUNCTION OF WHEEL IDENTIFICATION

(75) Inventor: Nobuya Watabe, Nagoya (JP)

(73) Assignee: Denso Corporation, Kariya (JP)

( * ) Notice: Subject to any disclaimer, the term of this patent is extended or adjusted under 35 U.S.C. 154(b) by 347 days.

(21) Appl. No.: 11/583,773

(22) Filed: Oct. 20, 2006

(65) Prior Publication Data

US 2007/0090970 A1    Apr. 26, 2007

(30) Foreign Application Priority Data

Oct. 21, 2005 (JP) ............... 2005-307263

(51) Int. Cl.
*B60C 23/00* (2006.01)
*B60C 23/02* (2006.01)
*B60C 29/00* (2006.01)
*B60Q 1/00* (2006.01)

(52) U.S. Cl. .................. 340/447; 340/442; 340/438; 340/686; 73/146

(58) Field of Classification Search ............ 340/447, 340/438, 442, 686; 73/146.1–146.7; 280/63; 701/1
See application file for complete search history.

(56) References Cited

U.S. PATENT DOCUMENTS

2003/0001735 A1* 1/2003 Honeck et al. ........... 340/445
2004/0095233 A1* 5/2004 DeZorzi et al. .......... 340/446
2005/0187667 A1* 8/2005 Vredevoogd et al. ....... 701/1
2006/0010961 A1* 1/2006 Gibson et al. ............ 73/40
2007/0008097 A1* 1/2007 Mori et al. ............. 340/505

FOREIGN PATENT DOCUMENTS

| JP | 3212311 | 7/2001 |
| JP | 2005-047470 | 2/2005 |
| JP | 2005-157416 | 6/2005 |

OTHER PUBLICATIONS

U.S. Appl. No. 11/481,061, filed Jul. 2006.

* cited by examiner

*Primary Examiner*—Daniel Wu
*Assistant Examiner*—Fekadeselassie Girma
(74) *Attorney, Agent, or Firm*—Nixon & Vanderhye PC

(57) ABSTRACT

According to the present invention, a wheel identifying apparatus includes a plurality of transceivers, each of which is located on one of a plurality of wheels of a vehicle, a triggering device, a receiver, and a wheel identifier. The triggering device is located on a body of the vehicle at different distances from the transceivers and works to transmit a trigger signal. Each of the transceivers works to receive the trigger signal, determine the strength of the trigger signal thereat, correct the determined strength using a correction value, and transmit a response signal indicative of the corrected strength. The receiver works to receive all the response signals transmitted by the transceivers. The wheel identifier works to identify, for each of the response signals received by the receiver, the wheel on which the transceiver having transmitted the response signal is located based on the corrected strength indicated by the response signal.

22 Claims, 17 Drawing Sheets

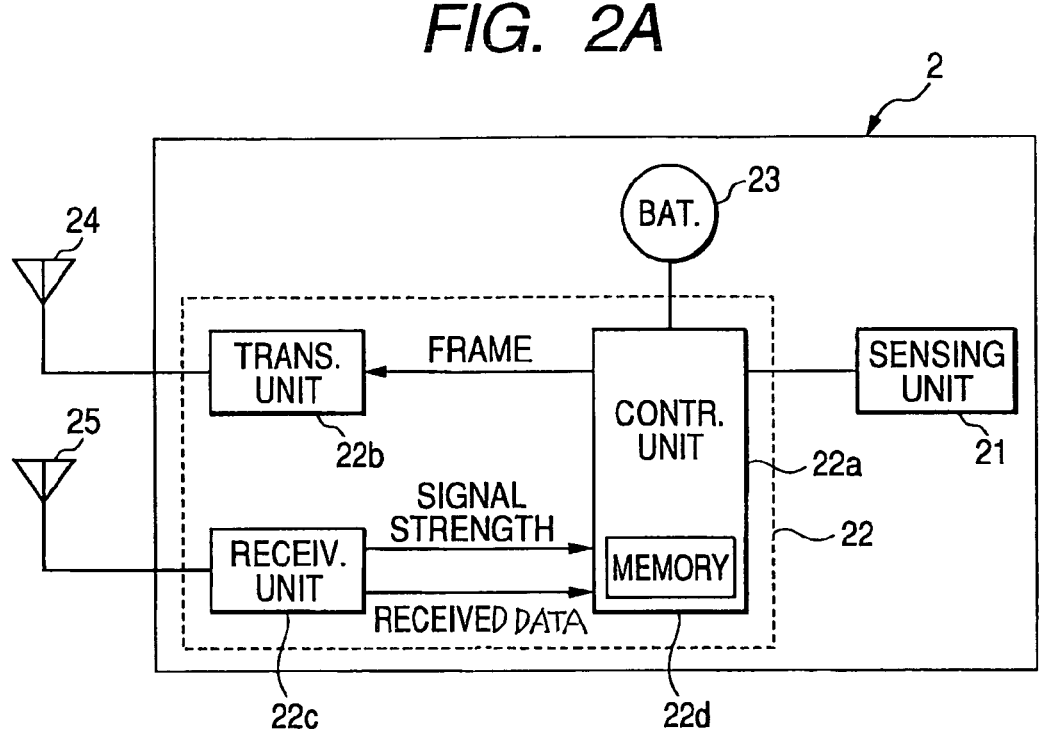
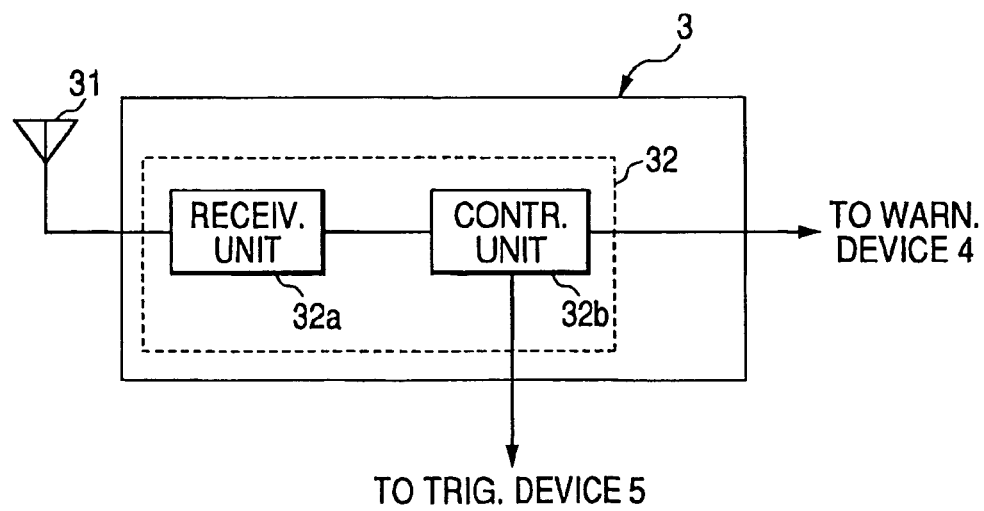

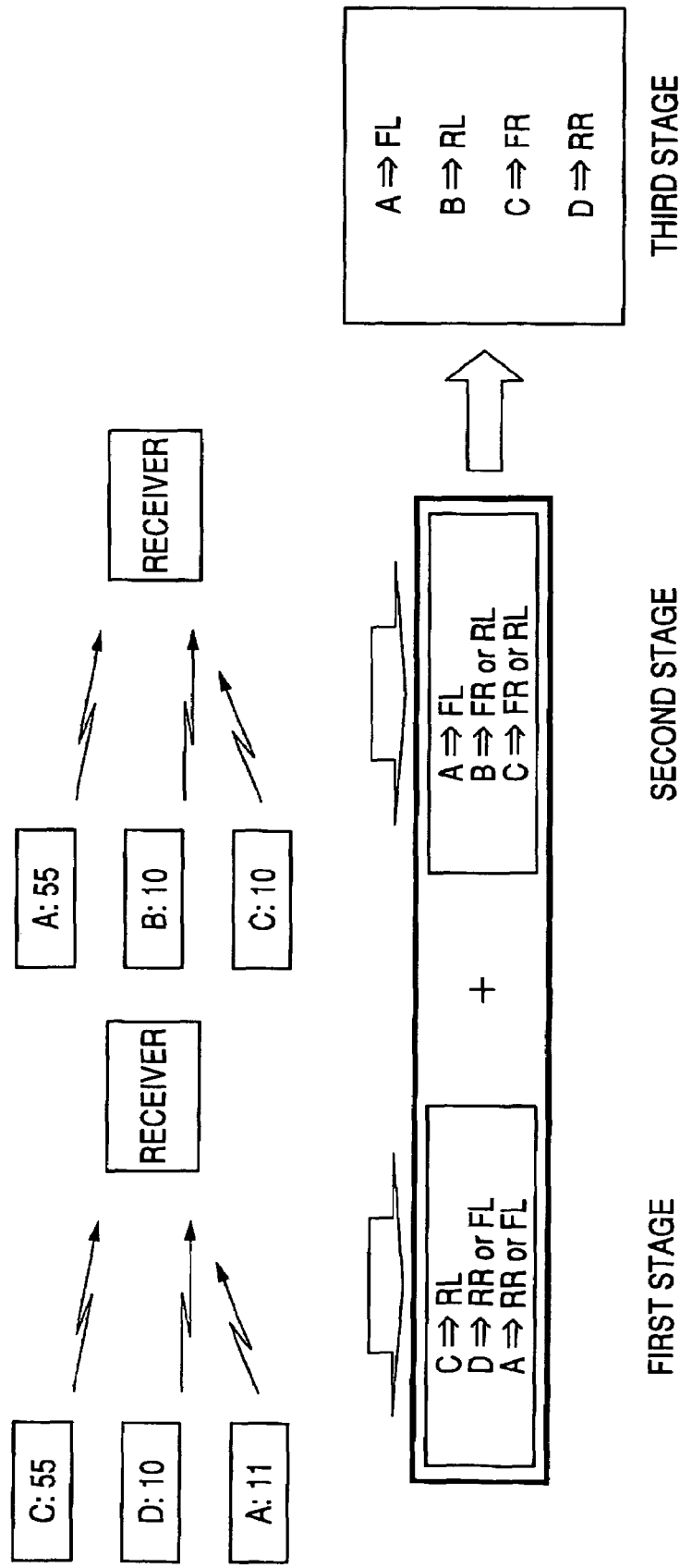

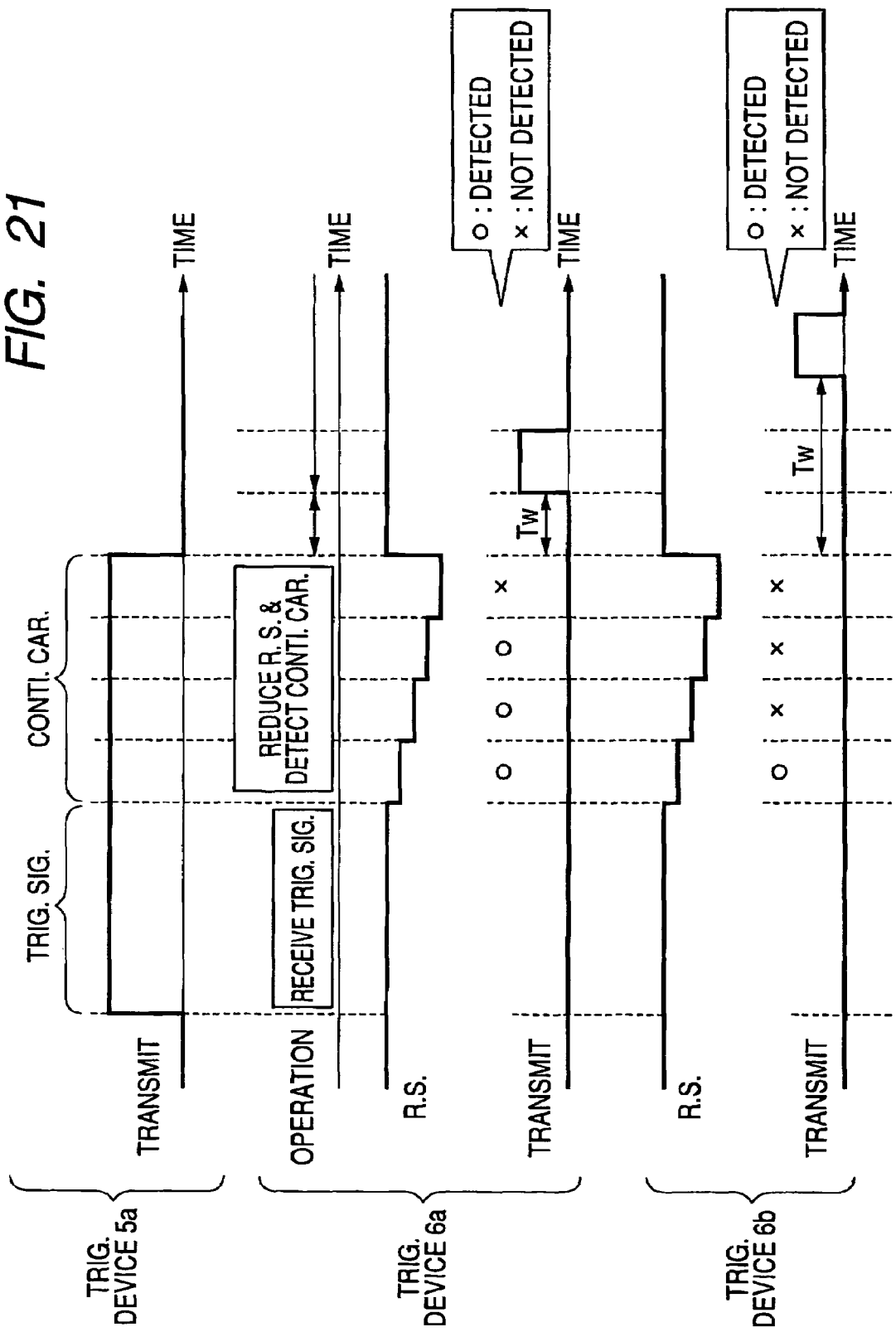

WHEEL IDENTIFYING APPARATUS AND TIRE INFLATION PRESSURE DETECTING APPARATUS WITH FUNCTION OF WHEEL IDENTIFICATION

CROSS-REFERENCE TO RELATED APPLICATION

This application is based on and claims priority from Japanese Patent Application No. 2005-307263, filed on Oct. 21, 2005, the content of which is hereby incorporated by reference into this application.

BACKGROUND OF THE INVENTION

1. Technical Field of the Invention

The present invention relates generally to tire inflation pressure detecting apparatuses for detecting the inflation pressure of tires on a vehicle and tire location detecting apparatuses for automatically detecting the locations of tires on a vehicle.

More particularly, the invention relates to a direct-type tire inflation pressure detecting apparatus which has a function of wheel identification.

2. Description of the Related Art

Conventional direct-type tire inflation pressure detecting apparatuses generally include a plurality of transmitters and a receiver.

Each of the transmitters is directly mounted on one of a plurality of wheels of a vehicle and includes a pressure sensor working to sense the inflation pressure of a tire fitted on the wheel. Each of the transmitters is configured to transmit a pressure signal representative of the inflation pressure of the tire sensed by the pressure sensor.

The receiver is mounted on the body of the vehicle and includes at least one antenna. The receiver is configured to receive the pressure signals transmitted from the transmitters via the antenna and determine the inflation pressure of the tires based on the received pressure signals.

In the above arrangement, in addition to the pressure signals transmitted by the transmitters, the receiver may also receive pressure signals transmitted by external transmitters. However, it is impossible for the receiver to determine whether a pressure signal received thereby has been transmitted by one of the transmitters or by an external transmitter. Moreover, it is also impossible for the receiver to detect the locations of the transmitters (i.e., the tires) on the vehicle. In other words, the receiver cannot identify the wheel on which the transmitter having transmitted a pressure signal and the tire whose inflation pressure is indicated by the pressure signal are located.

To solve the above problems, as disclosed in U.S. Pat. No. 5,602,524, each of the transmitters may be configured to transmit an identification signal (to be referred to as ID signal hereinafter) representative of the identity thereof along with the pressure signal. On the other hand, the receiver may be configured to have reference ID signals registered therein, each of which coincides with the ID signal of one of the transmitters and is associated with the location of that transmitter.

Thus, the receiver may work to compare an ID signal received thereby with the reference ID signals registered therein and identify the transmitter which has transmitted the ID signal when the ID signal coincides with one of the reference ID signals.

Consequently, the receiver can identify the wheel on which the identified transmitter is mounted. More specifically, the receiver can determine whether the wheel is a FR (front-right), a FL (front-left), a RR (rear-right), or a RL (rear-left) wheel of the vehicle. Further, the receiver can determine the inflation pressure of the tire fitted on the identified wheel based on the pressure signal received along with the ID signal.

However, with the above configuration, it is required to previously register the ID signals specific to the respective transmitters as reference ID signals in the receiver through associating the ID signals with the locations of the respective transmitters on the vehicle (i.e., the wheels on which the respective transmitters are mounted). Moreover, as tire replacement or rotations are performed, it is required to update the reference ID signals in the receiver.

However, the registration of the ID signals in the receiver is a time-consuming task, and thus it is desired to automatically perform the registration task. Further, for automatically performing the registration task, it is desired to automatically detect the locations of the transmitters (or the associated tires), in other words, to automatically identify the wheel on which each of the transmitters (or the associated tires) is located.

SUMMARY OF THE INVENTION

The present invention has been made in view of the above-mentioned problems.

It is, therefore, an object of the present invention to provide a wheel identifying apparatus for a vehicle which can automatically and accurately identify, for each of the transmitters (or transceivers), the wheel on which it is located without performing the time-consuming ID signal registration task.

It is a further object of the present invention to provide a wheel identifying apparatus for a vehicle which can automatically and accurately identify, for each of the transmitters (or transceivers), the wheel on which it is located without using any ID signals.

It is a still further object of the present invention to provide a tire inflation pressure detecting apparatus for a vehicle which can automatically and accurately detect the locations as well as the inflation pressure of-tires on the vehicle.

According to one aspect of the present invention, there is provided a wheel identifying apparatus which includes a first and a second transceiver, a triggering device, a receiver, and a wheel identifier.

The first and second transceivers are respectively located on a first and a second wheel of a vehicle. Each of the transceivers works to receive a trigger signal and transmit a response signal in response to receipt of the trigger signal.

The triggering device works to transmit the trigger signal. The triggering device is located on a body of the vehicle at different distances from the transceivers, so that strengths of the trigger signal at the transceivers are different from each other.

The receiver works to receive the response signals transmitted by the transceivers.

The wheel identifier is operatively connected to the receiver. The wheel identifier works to identify, for each of the response signals received by the receiver, the wheel on which the transceiver having transmitted the response signal is located.

According to an embodiment of the invention, the wheel identifying apparatus is further configured such that:

each of the transceivers has a correction value according to a receiver sensitivity thereof, upon receipt of the trigger signal transmitted by the triggering device, each of the transceivers determines the strength of the trigger signal thereat, corrects the determined strength of the trigger signal using the correction value thereof, and transmits the response signal which conveys signal strength information indicative of the corrected strength of the trigger signal, and the wheel identifier identifies, for each of the response signals received by the receiver, the wheel on which the transceiver having transmitted the response signal is located based on the signal strength information conveyed by the response signal.

According to another embodiment of the invention, the wheel identifying apparatus is further configured such that:

each of the transceivers has a correction value according to a receiver sensitivity thereof, upon receipt of the trigger signal transmitted by the triggering device, each of the transceivers determines the strength of the trigger signal thereat, corrects the determined strength of the trigger signal using the correction value thereof, determines a transmission time according to the corrected strength of the trigger signal, and transmits the response signal at the determined transmission time, the receiver receives the response signals transmitted by the transceivers at different reception times, and the wheel identifier identifies, for each of the response signals received by the receiver, the wheel on which the transceiver having transmitted the response signal is located based on the reception time at which the response signal is received by the receiver.

According to yet another embodiment of the invention, the wheel identifying apparatus is further configured such that:

the triggering device transmits, after transmission of the trigger signal, a continuous carrier that consecutively follows the trigger signal, each of the transceivers has a variable receiver sensitivity and a correction value according to the receiver sensitivity, in response to receipt of the trigger signal, each of the transceivers changes the receiver sensitivity thereof from a highest value to a lowest value in a plurality of stages, and determines the one of the stages from which it becomes impossible for the transceiver to detect the continuous carrier, each of the transceivers further determines a parameter, which is indicative of the determined stage, corrects the determined parameter using the correction value, determines a transmission time according to the corrected parameter, and transmits the response signal at the determined transmission time, the receiver receives the response signals transmitted by the transceivers at different reception times, and the wheel identifier identifies, for each of the response signals received by the receiver, the wheel on which the transceiver having transmitted the response signal is located based on the reception time at which the response signal is received by the receiver.

According to still another embodiment of the invention, the wheel identifying apparatus is further configured such that:

the triggering device transmits, after transmission of the trigger signal, a continuous carrier that consecutively follows the trigger signal, each of the transceivers has a variable receiver sensitivity and a correction value according to the receiver sensitivity, in response to receipt of the trigger signal, each of the transceivers changes the receiver sensitivity thereof from a highest value to a lowest value in a plurality of stages, and determines the one of the stages from which it becomes impossible for the transceiver to detect the continuous carrier, each of the transceivers further determines a parameter, which is indicative of the determined stage, corrects the determined parameter using the correction value, and transmits the response signal which conveys data representing the corrected parameter, and the wheel identifier identifies, for each of the response signals received by the receiver, the wheel on which the transceiver having transmitted the response signal is located based on the data conveyed by the response signal.

According to another aspect of the present invention, there is provided a tire inflation pressure detecting apparatus which includes a first and a second pressure sensor, a first and a second transceiver, a triggering device, a receiver, a wheel identifier, and a tire pressure determiner.

The first and second pressure sensors are respectively located on a first and a second wheel of a vehicle. Each of the pressure sensors works to sense inflation pressure of an associated one of tires fitted on the first and second wheels and output tire pressure information indicative of the sensed inflation pressure of the associated tire.

The first and second transceivers are respectively located on the first and second wheels of the vehicle. Each of the transceivers works to receive a trigger signal and transmit a response signal, which conveys the tire pressure information outputted by an associated one of the first and second pressure sensors, in response to receipt of the trigger signal.

The triggering device works to transmit the trigger signal. The triggering device is located on a body of the vehicle at different distances from the transceivers, so that strengths of the trigger signal at the transceivers are different from each other.

The receiver works to receive the response signals transmitted by the transceivers.

The wheel identifier is operatively connected to the receiver. The wheel identifier works to identify, for each of the response signals received by the receiver, the wheel on which the transceiver having transmitted the response signal is located.

The tire pressure determiner is operatively connected to the receiver and the wheel identifier. The tire pressure determiner works to determine, for each of the response signals received by the receiver, the inflation pressure of the tire that is located on the same wheel as the transceiver having transmitted the response signal based on the tire pressure information conveyed by the response signal.

According to an embodiment of the invention, the tire inflation pressure detecting apparatus is further configured such that:

each of the transceivers has a correction value according to a receiver sensitivity thereof, upon receipt of the trigger signal transmitted by the triggering device, each of the transceivers determines the strength of the trigger signal thereat, corrects the determined strength of the trigger signal using the correction value thereof, and transmits the response signal which conveys signal strength information indicative of the corrected strength of the trigger signal along with the tire pressure information, and the wheel identifier identifies, for each of the response signals received by the receiver, the wheel on which the transceiver having transmitted the response signal is located based on the signal strength information conveyed by the response signal.

According to another embodiment of the invention, the tire inflation pressure detecting apparatus is further configured such that:

each of the transceivers has a correction value according to a receiver sensitivity thereof, upon receipt of the trigger signal transmitted by the triggering device, each of the transceivers determines the strength of the trigger signal thereat, corrects the determined strength of the trigger signal using the correction value thereof, determines a transmission time according to the corrected strength of the trigger signal, and transmits the response signal at the determined transmission time, the receiver receives the response signals transmitted by the transceivers at different reception times, and the wheel identifier identifies, for each of the response signals received by the receiver, the wheel on which the transceiver having transmitted the response signal is located based on the reception time at which the response signal is received by the receiver.

According to yet another embodiment of the invention, the tire inflation pressure detecting apparatus is further configured such that:

the triggering device transmits, after transmission of the trigger signal, a continuous carrier that consecutively follows the trigger signal, each of the transceivers has a variable receiver sensitivity and a correction value according to the receiver sensitivity, in response to receipt of the trigger signal, each of the transceivers changes the receiver sensitivity thereof from a highest value to a lowest value in a plurality of stages, and determines the one of the stages from which it becomes impossible for the transceiver to detect the continuous carrier, each of the transceivers further determines a parameter, which is indicative of the determined stage, corrects the determined parameter using the correction value, determines a transmission time according to the corrected parameter, and transmits the response signal at the determined transmission time, the receiver receives the response signals transmitted by the transceivers at different reception times, and the wheel identifier identifies, for each of the response signals received by the receiver, the wheel on which the transceiver having transmitted the response signal is located based on the reception time at which the response signal is received by the receiver.

According to still another embodiment of the invention, the tire inflation pressure detecting apparatus is further configured such that:

the triggering device transmits, after transmission of the trigger signal, a continuous carrier that consecutively follows the trigger signal, each of the transceivers has a variable receiver sensitivity and a correction value according to the receiver sensitivity, in response to receipt of the trigger signal, each of the transceivers changes the receiver sensitivity thereof from a highest value to a lowest value in a plurality of stages, and determines the one of the stages from which it becomes impossible for the transceiver to detect the continuous carrier, each of the transceivers further determines a parameter, which is indicative of the determined stage, corrects the determined parameter using the correction value, and transmits the response signal which conveys data representing the corrected parameter along with the tire pressure information, and the wheel identifier identifies, for each of the response signals received by the receiver, the wheel on which the transceiver having transmitted the response signal is located based on the data conveyed by the response signal.

Consequently, through providing the above wheel identifying apparatus and tire inflation pressure detecting apparatus, the objects of the present invention are achieved.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings:

FIG. 2A is a functional block diagram showing the configuration of transceivers of the tire inflation pressure detecting apparatus of FIG. 1;

FIG. 2B is a functional block diagram showing the configuration of a receiver of the tire inflation pressure detecting apparatus of FIG. 1;

FIG. 15 is a schematic view illustrating an example of the wheel identification process of the tire inflation pressure detecting apparatus of FIG. 13;

FIG. 21 is a time chart illustrating the wheel identification process of the tire inflation pressure detecting apparatus of FIG. 16.

DESCRIPTION OF THE PREFERRED EMBODIMENTS

Figure 1:
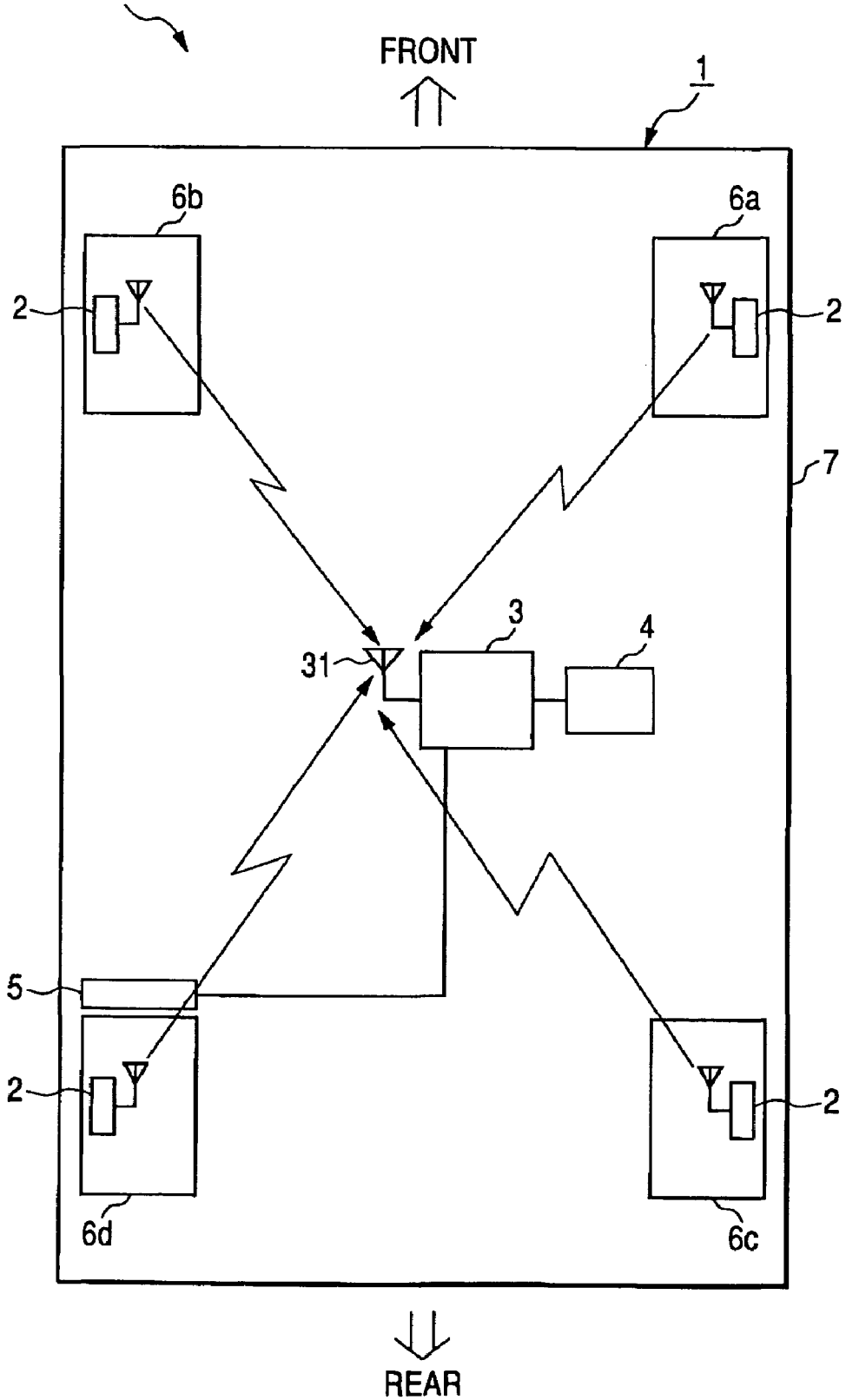
FIG. 1 is a schematic view showing the overall configuration of a tire inflation pressure detecting apparatus according to the first embodiment of the invention.

The preferred embodiments of the present invention will be described hereinafter with reference to FIGS. 1-21.

It should be noted that, for the sake of clarity and understanding, identical components having identical functions in different embodiments of the invention have been marked, where possible, with the same reference numerals in each of the figures.

First Embodiment

FIG. 1 shows the overall configuration of a tire inflation pressure detecting apparatus S1 according to the first embodiment of the invention.

The tire inflation pressure detecting apparatus S1 is installed to a vehicle 1 and configured to detect the inflation pressure of four tires each of which is fitted on one of four wheels 6a-6d of the vehicle 1 (i.e., the FR wheel 6a, the FL wheel 6b, the RR wheel 6c, and the RL wheel 6d).

As shown in FIG. 1, the tire inflation pressure detecting apparatus S1 includes four transceivers 2, a receiver 3, a warning device 4, and a triggering device 5.

Each of the transceivers 2 is mounted on one of the four wheels 6a-6d, so as to have association with the tire on the one of the wheels 6a-6d.

Each transceiver 2 works to sense the inflation pressure of the associated tire and transmit a frame that contains tire pressure information indicative of the sensed inflation pressure of the associated tire.

Referring to FIG. 2A, each transceiver 2 is configured with a sensing unit 21, a microcomputer 22, a battery 23, a transmitting antenna 24, and a receiving antenna 25.

The sensing unit 21 is configured with sensors, such as a diaphragm-type pressure sensor and a temperature sensor, and works to output signals representative of the sensed inflation pressure of the tire and the sensed temperature of air within the tire.

The microcomputer 22 is of a well-known type and functionally includes a controlling unit 22a, a transmitting unit 22b, and a receiving unit 22c. The microcomputer 22 is configured to implement predetermined processes in accordance with a program installed in a memory 22d of the controlling unit 22a.

The controlling unit 22a works to receive the signals outputted from the sensing unit 21 and process those signals. The controlling unit 22a also works to assemble the frame, which contains the tire pressure information indicative of the inflation pressure of the tire sensed by the sensing unit 21, and provide the frame to the transmitting unit 22b.

Further, the controlling unit 22a works to receive, via the receiving antenna 25 and the receiving unit 22c, a trigger signal transmitted by the triggering device 5, determine the strength of the received trigger signal through signal processing thereof, and correct the determined strength using a correction value Ec stored in the memory 22d. The controlling unit 22a also works to store, in the frame or another frame, signal strength information indicative of the corrected strength.

Furthermore, the controlling unit 22a works to control the transmitting unit 22b to transmit the frame.

The transmitting unit 22b works to transmit, via the transmitting antenna 24, the frame provided by the controlling unit 22a to the receiver 3. The frame is transmitted at a frequency, for example, within the RF range.

The receiving unit 22c works to receive, via the receiving antenna 25, the trigger signal transmitted by the triggering device 5 and provide the received trigger signal to the controlling unit 22a. The trigger signal is transmitted at a frequency, for example, within the LF range, and the receiving unit 22c has a receiver sensitivity not less than 120 db μ V.

The memory 22d is configured with a nonvolatile memory and stores therein the program and other necessary data, such as the correction value Ec.

The battery 23 is provided to supply electrical power necessary for operation of the transceiver 2.

The above-described transceivers 2 are each fixed to an air valve of an associated one of the wheels 6a-6d of the vehicle 1 and at least the sensing unit 21 thereof is placed inside the tire on the associated wheel to be exposed to the air within the tire.

On the other hand, the receiver 3 is mounted on the body 7 of the vehicle 1. The receiver 3 works to receive all the frames transmitted by the transceivers 2 and determine the inflation pressure of the four tires based on the tire pressure information contained in the received frames. The receiver 3 also works to identify, for each of the received frames, the wheel on which the transceiver 2 having transmitted the frame is mounted.

Referring to FIG. 2B, the receiver 3 is configured with a receiving antenna 31 and a microcomputer 32.

The receiving antenna 31 is fixed to the body 7 of the vehicle 1 to receive, as illustrated in FIG. 1, all the frames transmitted by the four transceivers 2.

The microcomputer 32 is of a well-known type and functionally includes a receiving unit 32a and a controlling unit 32b. The microcomputer 32 is configured to implement predetermined processes in accordance with a program installed in a memory (not shown) of the controlling unit 32b.

The receiving unit 32a works to receive, via the receiving antenna 31, all the frames transmitted by the transceivers 2 and provide the received frames to the controlling unit 32b.

The controlling unit 32b works to output a command signal to the triggering device 5 for causing the triggering device 5 to transmit the trigger signal. The controlling unit 32b also works to identify, for each of the frames received from the receiving unit 32a, the wheel on which the transceiver 2 having transmitted the frame is mounted based on the signal strength information contained in the frame.

The controlling unit 32b further works to determine, for each of the frames received from the receiving unit 32a, the inflation pressure of the tire that is located on the same wheel as the transceiver 2 having transmitted the frame based on the tire pressure information contained in the frame.

Thus, both the inflation pressure and the location of each of the four tires can be determined by the controlling unit 32b. When the determined inflation pressure of any of the four tires is decreased to below a predetermined threshold Th, the controlling unit 32b outputs a warning signal indicative of both the decreased inflation pressure and the location of the tire.

The warning device 4 is, as illustrated in FIG. 1, electrically connected to the receiver 3 and arranged in a location visible for the driver of the vehicle 1. The warning device 4 is configured with, for example, a warning display on the instrument panel of the vehicle 1. The warning device 4 works to inform, in response to receipt of the warning signal from the receiver 3, the driver of both the decreased inflation pressure and the location of the tire.

The triggering device 5 works to transmit, in response to receipt of the command signal from the receiver 3, the trigger signal with predetermined strength. The triggering device 5 is arranged on the body 7 of the vehicle 1 at different distances from the wheels 6a-6d, so that the strengths of the trigger signal at the transceivers 2 are different from each other. For example, in the present embodiment, the triggering device 5 is arranged, as illustrated in FIG. 1, in close vicinity to the RL wheel 6d of the vehicle 1. Thus, the distances from the triggering device 5 to the wheels 6a-6d increase in the order of the RL wheel 6d, the RR wheel 6c, the FL wheel 6b, and the FR wheel 6a.

In addition, it is preferable for the triggering device 5 to be arranged in such a location that no metal member covers the triggering device 5 and it is possible to protect the triggering device 5 from foreign matters, such as water or stones, during running of the vehicle 1. Further, it is also preferable for the triggering device 5 to be arranged in such a location that the differences between the distances from the triggering device 5 to the wheels 6a-6d are large. For example, the triggering device 5 may be arranged on the rear side of the RR wheel 6c and the RL wheel 6D or on the front side of the FR wheel 6a and the FL wheel 6b.

As described previously, in the present embodiment, the triggering device 5 is arranged on the body 7 of the vehicle 1 at different distances from the wheels 6a-6d, so that the receiver 3 can identify, for each of the frames received thereby, the wheel on which the transceiver 2 having transmitted the frame is mounted based on the fact that the strengths of the trigger signal at the transceivers 2 are different from each other.

To accurately perform the wheel identification in this way, it is essential that all the transceivers 2 have the same receiver sensitivity. However, due to manufacturing tolerances, there generally exist slight differences in receiver sensitivity among the transceivers 2. Therefore, to ensure the accuracy of the wheel identification, it is necessary for each of the transceivers 2 to make a correction for the determined strength of the trigger signal thereat using the correction value Ec.

Figure 3:
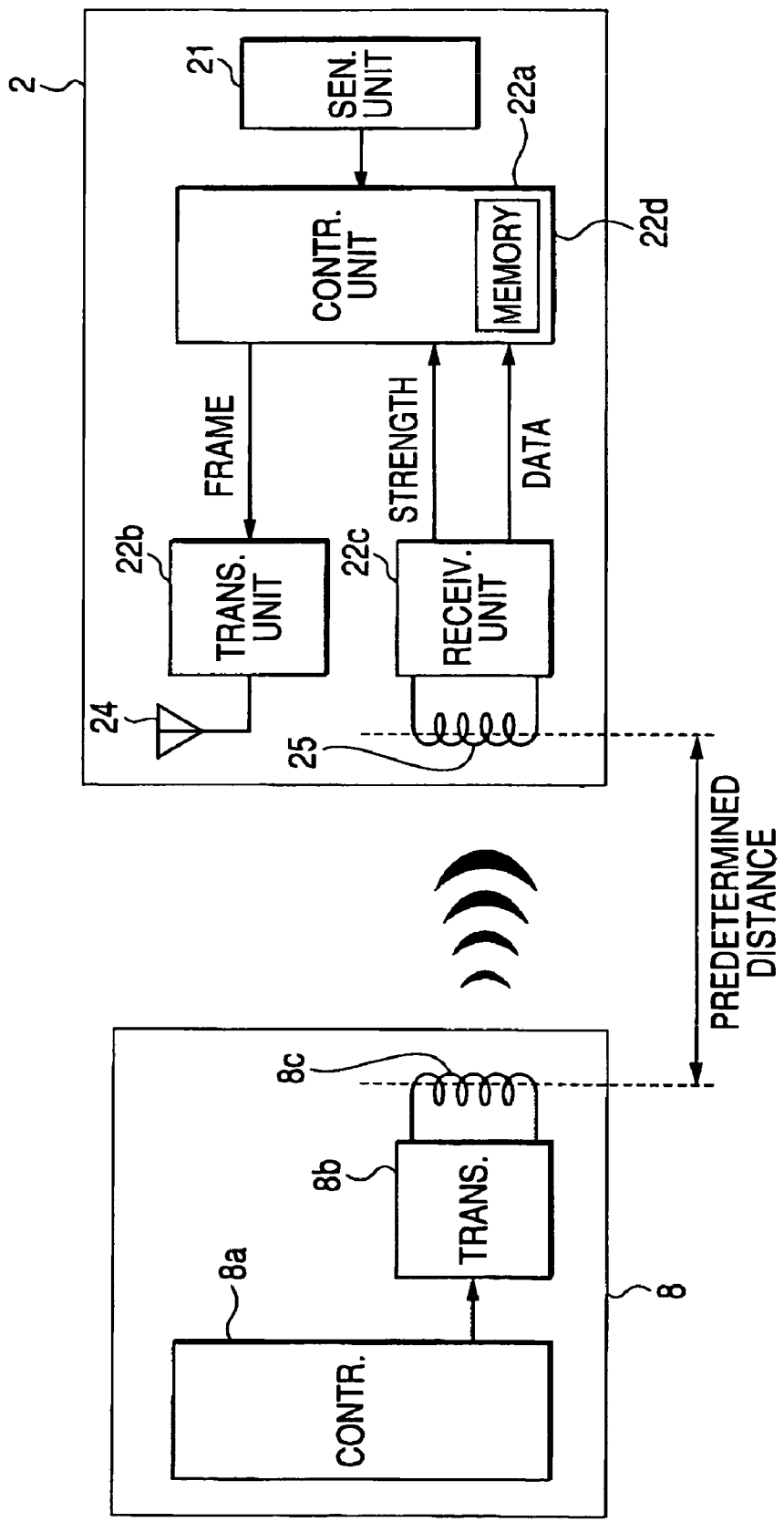
FIG. 3 is a functional block diagram showing the configuration of a correction apparatus along with that of the transceivers of FIG. 2A.

The correction value Ec is predetermined and stored in each of the transceivers 2 by using a correction apparatus 8, which is shown in FIG. 3 along with one of the transceivers 2.

The correction apparatus 8 is included in a quality inspection line configured at the factory and functionally includes a controller 8a, a transmitter 8b, and a transmitting antenna 8c.

The controller 8a controls the transmitter 8b to transmit, via the transmitting antenna 8c, a command signal that indicates a correction value determination command. The command signal is transmitted with a predetermined strength at a frequency, for example, within the LF range.

Considering the differences in receiver sensitivity among the transceivers 2, the predetermined strength should be high enough for all of the transceivers 2 to receive the command signal. At the same time, the predetermined strength should also be not too high. This is because if the predetermined strength is too high and thus deviated from the strength with which the triggering device 5 actually transmits the trigger signal, the strength of the trigger signal at each of the transceivers 2 could not be accurately corrected.

As an example, when the lowest value (i.e., the guaranteed value) of receiver sensitivity of the transceivers 2 is 120 dB μ V, then the predetermined strength can be so set that the command signal input to the transceivers 2 is equal to 125 dB μV.

The correction apparatus 8 is located, as illustrated in FIG. 3, with a predetermined distance to the transceiver 2. It is preferable that the distance from the transmitting antenna 8c of the correction apparatus 8 to the receiving antenna 24 of the transceiver 2 is equal to the predetermined distance. In addition, the predetermined distance is generally used to specify the physical distance from the correction apparatus 8 to the transceiver 2; however, in case that the command signal is transmitted from the correction apparatus 8 to the transceiver 2 through reflection, the predetermined distance is used to specify the moving distance of the command signal during the transmission.

Figure 4:
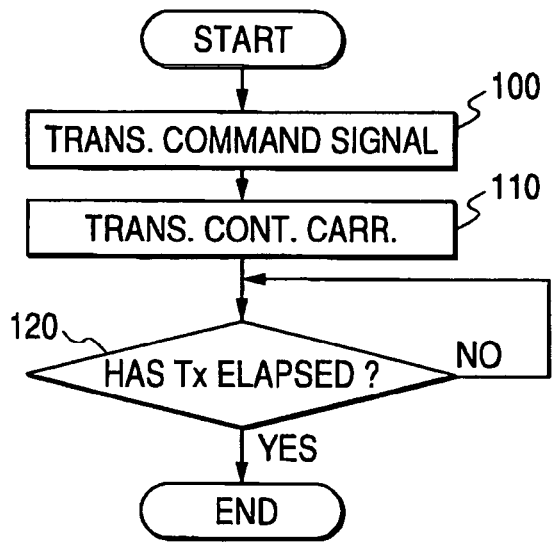
FIG. 4 is a flow chart showing a correction value determination process of the correction apparatus of FIG.3.

FIG. 4 shows the process of the controller 8a of the correction apparatus 8 for determination of the correction value Ec for each of the transceivers 2.

First, at the step 100, the controller 8a controls the transmitter 8b to transmit, with the predetermined strength, the command signal that indicates the correction value determination command.

At the succeeding step 110, the controller 8a further controls the transmitter 8b to transmit a continuous carrier with the predetermined strength.

At the step 120, the controller 8a waits for a predetermined time Tx to elapse, and then completes the process.

Figure 6:
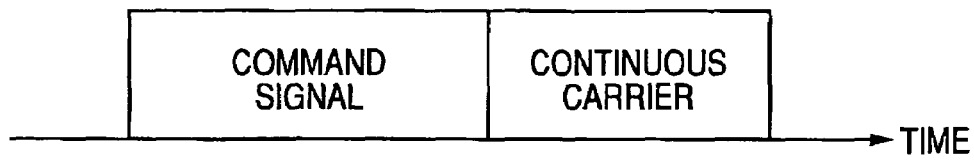
FIG. 6 is a time chart illustrating transmission of a command signal and a continuous carrier by the correction apparatus of FIG. 3.

Through performing the above process, the command signal and the continuous carrier are consecutively transmitted by the correction apparatus 8, as illustrated in FIG. 6.

Figure 5:
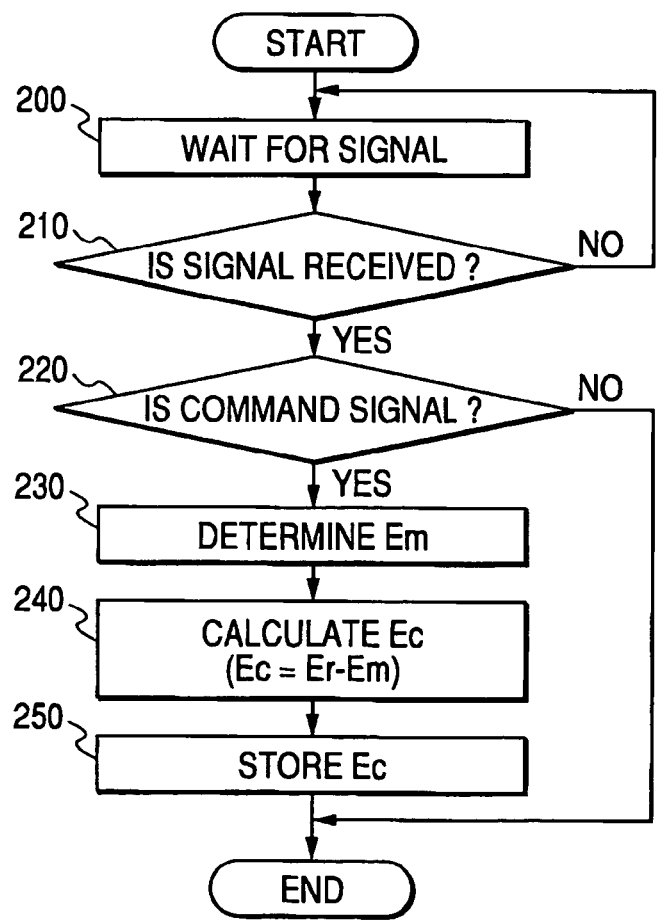
FIG. 5 is a flow chart showing a correction value determination process of each of the transceivers of FIG. 2A.

FIG. 5 shows the process of the controlling unit 22a of each of the transceivers 2 for determining the correction value Ec of the transceiver 2.

First, at the step 200, the controlling unit 22a waits for arrival of the command signal from the correction apparatus 8.

At the step 210, the controlling unit 22a determines whether a signal is received thereby.

If the determination at the step 210 produces a "NO" answer, then the process returns to the step 200.

Otherwise, if the determination at the step 210 produces a "YES" answer, then the process proceeds to the step 220.

At the step 220, the controlling unit 22a makes a further determination as to whether the received signal is the command signal transmitted by the correction apparatus 8, which indicates the correction value determination command.

If the determination at the step 220 produces a "NO" answer, then the process directly goes to the end.

Otherwise, if the determination at the step 220 produces a "YES" answer, then the process proceeds to the step 230.

At the step 230, the controlling unit 22a determines the strength Em of the continuous carrier at the transceiver 2.

At the step 240, the controlling unit 22a calculates the correction value Ec as the difference between a reference strength Er previously stored in the memory 22d and the determined strength Em (i.e., Ec=Er−Em).

At the succeeding step 250, the controlling unit 22a stores the calculated correction value Ec in the memory 22d thereof, and then completes the process.

As above, in the present embodiment, each of the transceivers 2 has determined and stored in the memory 22d thereof the correction value Ec specific thereto, thereby making it possible to correct the determined strength of the trigger signal thereat using the correction value Ec.

After having described the overall configuration of the tire inflation pressure detecting apparatus S1, operation thereof will be described hereinafter.

According to the present embodiment, the tire inflation pressure detecting apparatus S1 has two different operation modes. The first mode is "ID registration mode" and the second one is "tire pressure detection mode". The tire inflation pressure detecting apparatus S1 is configured to operate in the ID registration mode first and then in the tire pressure detection mode.

Specifically, when an ignition switch (not shown) of the vehicle 1 is turned from off to on, the receiver 3 and the triggering device 5 are supplied with electric power from a battery (not shown) on the vehicle 1, thus entering the ID registration mode.

Then, the controlling unit 32b of the receiver 3 outputs the command signal to the triggering device 5. In response to receipt of the command signal, the triggering device 5 transmits the trigger signal with the predetermined strength to each of the transceivers 2.

Upon receiving the trigger signal via the receiving antenna 25 and the receiving unit 22c, the controlling unit 22a of each of the transceivers 2 is activated to determine the strength of the trigger signal thereat.

Figure 7:
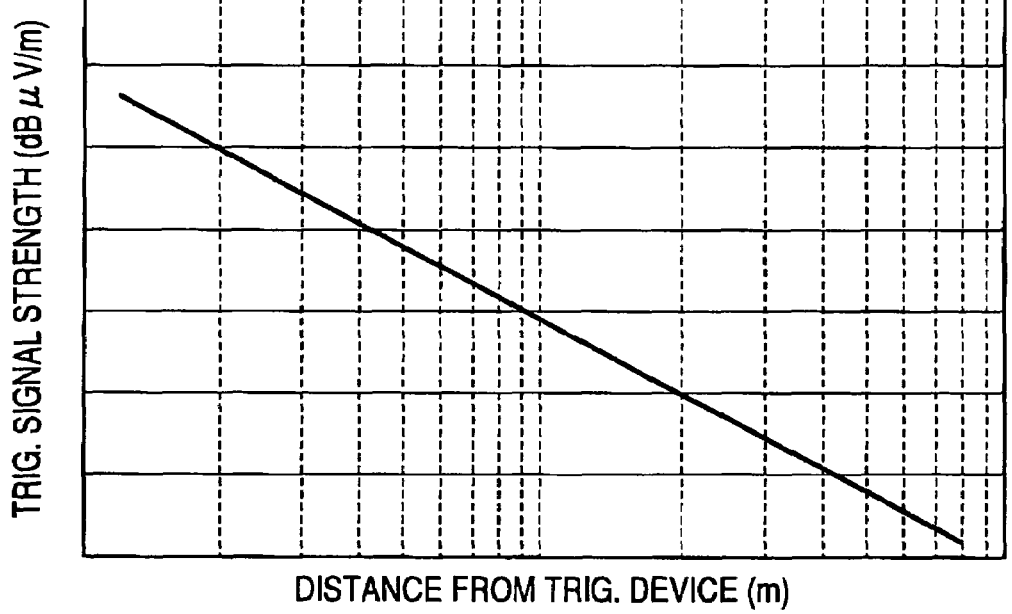
FIG. 7 is a graphical representation illustrating the attenuation characteristic of strength of a trigger signal, in a free space, with distance from a triggering device which transmits the trigger signal.
Figure 8:
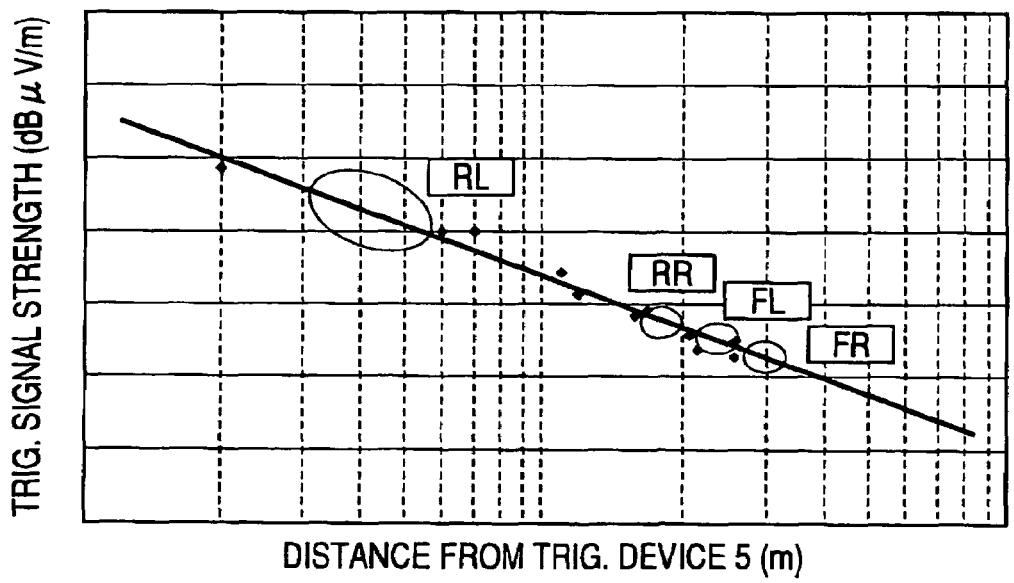
FIG. 8 is an application of FIG. 7 to the tire inflation pressure detecting apparatus of FIG. 1.

It is easy to understand that the strength of the trigger signal attenuates with increase in the distance from the triggering device 5. FIG. 7 illustrates the attenuation characteristic of strength of a trigger signal in a free space with distance from a triggering device which transmits the trigger signal. FIG. 8 illustrates an application of FIG. 7 to the tire inflation pressure detecting apparatus S1.

Specifically, as described above, the distances from the triggering device 5 to the wheels 6a-6d increase in the order of the RL wheel 6d, the RR wheel 6c, the FL wheel 6b, and the FR wheel 6a. Accordingly, the strengths of the trigger signal at the associated transceivers 2 decrease in the order of the RL wheel 6d, the RR wheel 6c, the FL wheel 6b, and the FR wheel 6a.

After determining the strength of the trigger signal thereat, the controlling unit 22a of each of the transceivers 2 corrects the determined strength of the trigger signal using the correction value Ec stored in the memory 22d thereof, and stores in the frame the signal strength information indicative of the corrected strength of the trigger signal along with ID information indicative of the identity of the transceiver 2. In addition, in the present embodiment, the controlling unit 22a of each of the transceivers 2 corrects the determined strength of the trigger signal by adding the correction value Ec to the determined strength.

Then, the controlling unit 22a sets a waiting time and controls the transmitting unit 22b to transmit the frame after elapse of the waiting time from receipt of the trigger signal. In addition, the waiting time may be set randomly, so as to allow all the transceivers 2 to transmit the respective frames at different times, thereby avoiding interference of the frames at the receiver 3.

Upon receipt of all the frames transmitted by the transceivers 2, the controlling unit 32b of the receiver 3 retrieves the signal strength information and ID information contained in the frames. Then, the controlling unit 32b orders the frames in the descending order of the corrected strengths of the trigger signal indicated by the signal strength information contained in the frames.

Through the ordering, the controlling unit 32b identifies the transceiver 2 which has transmitted the frame containing the signal strength information indicative of the maximum corrected strength as being mounted on the RL wheel 6d, that which has transmitted the frame containing the signal strength information indicative of the secondary corrected strength as being mounted on the RR wheel 6c, that which has transmitted the frame containing the signal strength information indicative of the third corrected strength as being mounted on the FL 6b, and that which has transmitted the frame containing the signal strength information indicative of the minimum corrected strength as being mounted on the RR wheel.

Figure 9:
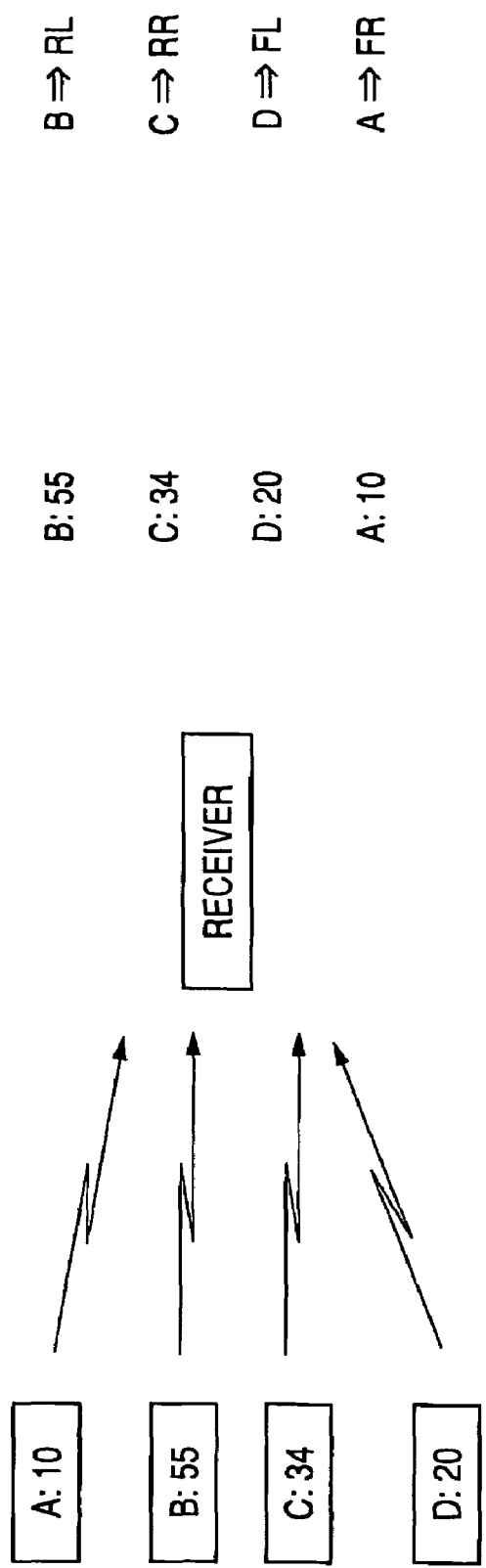
FIG. 9 is a schematic view illustrating an example of the wheel identification process of the tire inflation pressure detecting apparatus of FIG. 1.

More specifically, referring to FIG. 9, where the four transceivers 2 are respectively designated with their identifications A, B, C, and D, the corrected strengths of the trigger signal at the transceivers A-D are different from each other. For example, the corrected strengths of the trigger signal at the transceivers A-D are 10, 55, 34, and 20, respectively.

Figure 10:
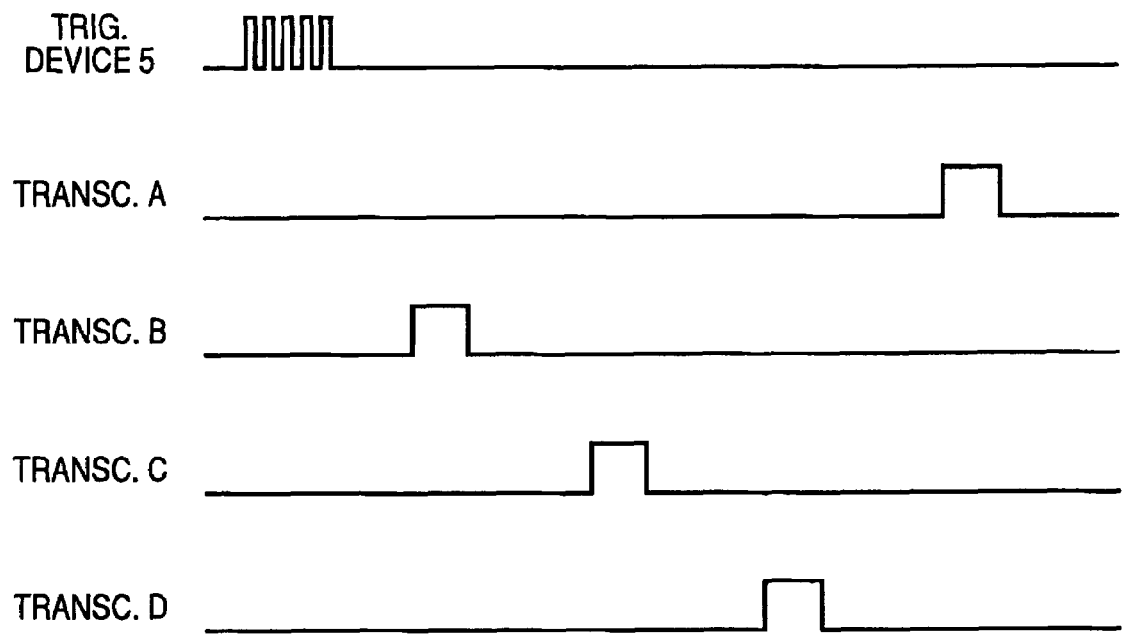
FIG. 10 is a time chart illustrating the transmission timings for a trigger signal and frames in the tire inflation pressure detecting apparatus of FIG. 1.

Referring further to FIG. 10, for transmission of the frames, the waiting times may be set to be in inverse proportion to the corrected strengths of the trigger signal. For example, a maximum waiting time may be set for the transceiver A at which the corrected strength of the trigger signal is minimum, so that the transceiver A transmits the frame at the last. Consequently, the transceivers A-D transmit the respective frames at different times, thus avoiding interference of the frames at the receiver 3.

Upon receipt of the frames transmitted by the transceivers A-D, the controlling unit 32b of the receivers 3 orders the transceivers A-D (in other words, orders the respective frames) in the descending order of the corrected strengths of the trigger signal thereat, thus resulting in the order of B, C, D, and A.

Through the ordering, controlling unit 32b identifies, for each of the transceivers A-D, the wheel on which it is mounted. Consequently, the transceiver B is identified as being mounted on the RL wheel 6d, the transceiver C is identified as being mounted on the RR wheel 6c, the transceiver D is identified as being mounted on the FL wheel 6b, and the transceiver A is identified as being mounted on the FR wheel 6a.

After the wheel identification, the controlling unit 32b of the receiver 3 registers in the memory thereof the ID information contained in the received frames as reference ID information associated with the respective identified wheels.

Then, the operation of the tire inflation pressure detecting apparatus S1 is shifted from the ID registration mode to the tire pressure detection mode.

In the tire pressure detection mode, the controlling unit 22a of each of the transceivers 2 receives the signals outputted from the sensing unit 21 and processes those signals. Then, the controlling unit 22a stores in the frame the tire pressure information indicative of the inflation pressure of the associated tire sensed by the sensing unit 21 along with the ID information indicative of the identification of the transceiver 2. Further, the controlling unit 22a controls the transmitting unit 22b to repeatedly transmit the frame at predetermined time intervals (e.g., one minute).

The controlling unit 32b of the receiver 3 receives all the frames transmitted by the transceivers 2 via the receiving antenna 31 and the receiving unit 32a.

Then, the controlling unit 32b identifies, for each of the received frames, the wheel on which the transceiver 2 having transmitted the frame is mounted through comparison of the ID information contained in the frame with all the reference ID information registered in the memory.

Further, the controlling unit 32b determines, for each of the received frames, the inflation pressure of the tire that is located on the same wheel as the transceiver 2 having transmitted the frame based on the tire pressure information contained in the frame.

In addition, each of the frames transmitted by the transceivers 2 may contain tire temperature information indicative of the temperature of air within the associated tire, so that the controlling unit 32b of the receiver 3 can perform, if necessary, temperature compensation for the determined inflation pressure of the tires based on the temperature information contained in the respective received frames.

Consequently, both the inflation pressure and location of each of the four tires are determined by the controlling unit 32b. When the determined inflation pressure of any of the four tires is decreased to below the predetermined threshold Th, the controlling unit 32b informs, via the warning device 4, the vehicle driver of both the decreased inflation pressure and location of the tire.

When the ignition switch of the vehicle 1 is turned from on to off, the controlling unit 32b of the receivers 3 transmits again the command signal, causing the triggering device 5 to transmit the trigger signal. Upon receiving the trigger signal via the receiving antenna 25 and the receiving unit 22c, the controlling unit 22a of each of the transceivers 2 is deactivated, thus completing the entire operation of the tire inflation pressure detecting apparatus S1.

The above-described tire inflation pressure detecting apparatus S1 according to the present embodiment has the following advantages.

In the tire inflation pressure detecting apparatus S1, the triggering device 5 is arranged on the body 7 of the vehicle 1 at different distances from the wheels 6a-6d, thus making the strengths of the trigger signal at the transceivers 2 different from each other; each of the transceivers 2 determines the strength of the trigger signal thereat, corrects the determined strength of the trigger signal using the correction value Ec specific thereto, and transmits the frame containing the signal strength information indicative of the corrected strength of the trigger signal; the receiver 3 identifies, for each of the frames received from the transceivers 2, the wheel on which the transceiver 2 having transmitted the frame is mounted based on the signal strength information contained in the frame.

With the above configuration, it is possible for the receiver 3 to accurately identify, for each of the frames received from the transceivers 2, the wheel on which the transceiver 2 having transmitted the frame is mounted even if there exist differences in receiver sensitivity among the transceivers 2.

Accordingly, with the above configuration, it is possible for the tire inflation pressure detecting apparatus S1 to automatically and accurately detect the locations as well as the inflation pressure of the tires on the vehicle 1.

Further, with the above configuration, it is possible for the tire inflation pressure detecting apparatus S1 to automatically and reliably perform the ID information registration task.

Furthermore, it is possible for all of the transceivers 2 to have the same configuration and for the receiver 3 to include only the single receiving antenna 31, thus decreasing the manufacturing cost of the tire inflation pressure detecting apparatus S1.

In addition, in the present embodiment, the tire inflation pressure detecting apparatus S1 is configured to operate in the two different modes, i.e., the ID registration mode and the tire pressure detection mode.

However, the tire inflation pressure detecting apparatus S1 may also be configured to operate only in a single mode in which: each of the transceivers 2 repeatedly transmits, at the predetermined time intervals, the frame that contains the tire pressure information indicative of the inflation pressure of the associated tire and the signal strength information indicative of the corrected strength of the trigger signal; the receiver 3 identifies, for each of the frames received from the transceivers 2, the wheel on which the transceiver 2 having transmitted the frame is mounted based on the signal strength information contained in the frame; the receiver 3 further determines, for each of the frames received from the transceivers 2, the inflation pressure of the tire that is located on the same wheel as the transceiver 2 having transmitted the frame based on the tire pressure information contained in the frame.

With such a modified configuration, it is possible to automatically and accurately detect the locations as well as the inflation pressure of the tires on the vehicle 1 without using any ID information.

Second Embodiment

This embodiment illustrates a tire inflation pressure detecting apparatus S2 which has almost the same configuration as the tire inflation pressure detecting apparatus S1 according to the previous embodiment. Accordingly, only the differences therebetween will be described hereinafter.

In the tire inflation pressure detecting apparatus S1, each of the four transceivers 2 receives the trigger signal transmitted by the triggering device 5 and transmits the frame containing the signal strength information indicative of the corrected strength of the trigger signal; the receiver 3 identifies, for each of the frames received from the four transceivers 2, the wheel on which the transceiver 2 having transmitted the frame is mounted based on the signal strength information contained in the frame.

In comparison, in the tire inflation pressure detecting apparatus S2, the triggering device 5 outputs the trigger signal with a limited strength, so that one of the four transceivers 2 cannot receive the trigger signal.

Figure 11:
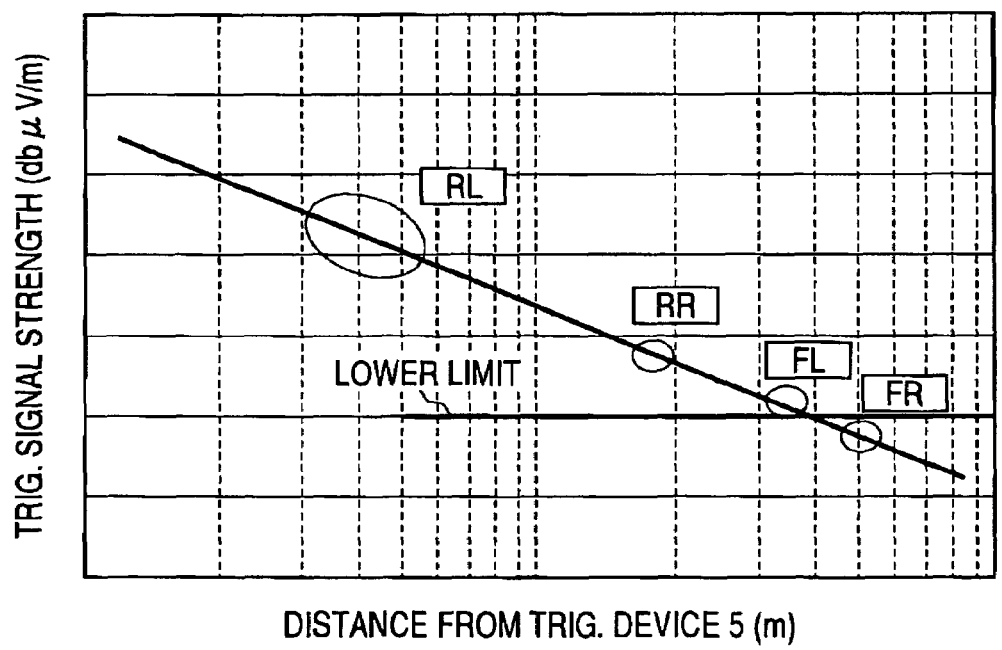
FIG. 11 is an application of FIG. 7 to a tire inflation pressure detecting apparatus according to the second embodiment of the invention.

Specifically, in some practical cases, the output strength of the trigger signal is limited due to regulations. Consequently, as illustrated in FIG. 11, the strength of the trigger signal at the transceiver 2 on the FR wheel 6a becomes lower than a lower limit of strength under which the transceiver 2 cannot detect the trigger signal.

The other three transceivers 2 that can receive the trigger signal operate in the same way as in the previous embodiment.

Figure 12:
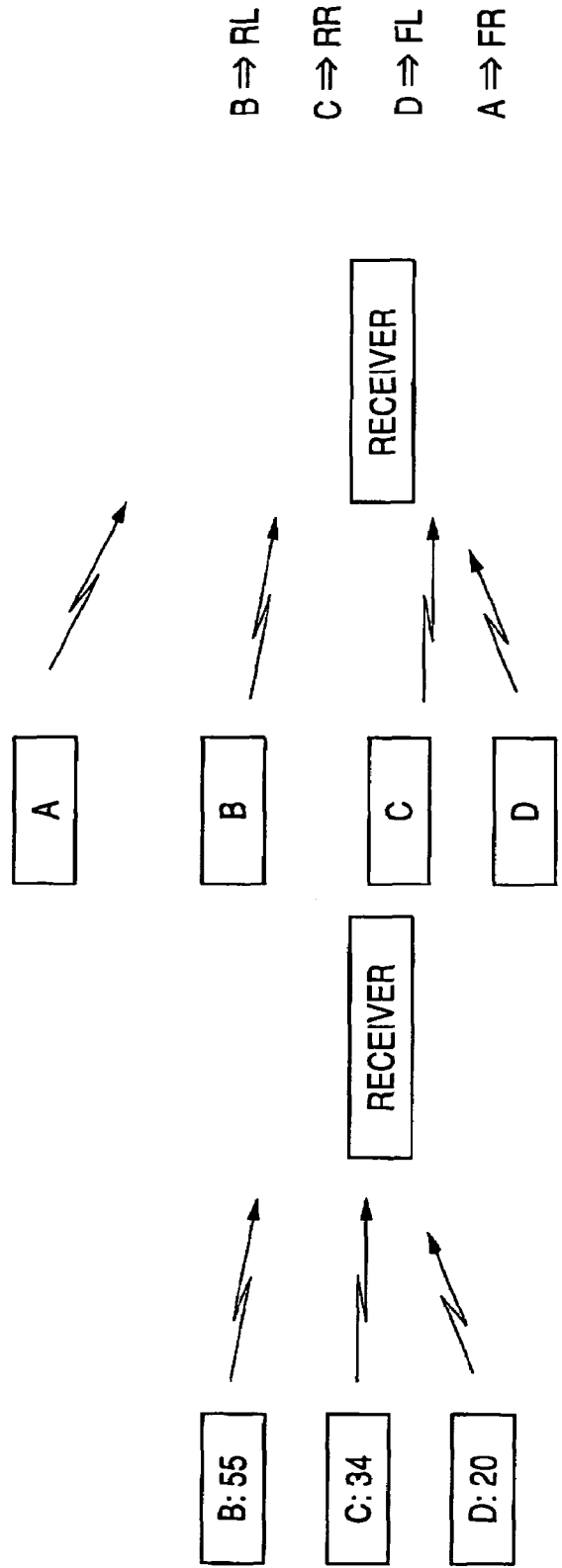
FIG. 12 is a schematic view illustrating an example of the wheel identification process of the tire inflation pressure detecting apparatus according to the second embodiment of the invention.

For example, referring to FIG. 12, the corrected strengths of the trigger signal at the three transceivers B-D are 55, 34, and 20, respectively.

In the ID registration mode, each of the three transceivers 2 transmits the frame that contains the signal strength information indicative of the corrected strength of the trigger signal at the transceiver 2 and the ID information indicative of the identification of the transceiver 2.

Upon receipt of the frames transmitted by the transceivers B-D, the controlling unit 32b of the receivers 3 orders the transceivers B-D (in other words, orders the respective frames) in the descending order of the corrected strengths of the trigger signal thereat, thus resulting in the order of B, C, and D.

Through the ordering, the controlling unit 32b identifies, for each of the transceivers B-D, the wheel on which it is mounted. Consequently, the transceiver B is identified as being mounted on the RL wheel 6d, the transceiver C is identified as being mounted on the RR wheel 6c, and the transceiver D is identified as being mounted on the FL wheel 6b.

After the wheel identification, the controlling unit 32b of the receiver 3 stores in the memory thereof the ID information indicative of the identifications B-D as the reference ID information associated with the respective identified wheels 6b-6d.

In the tire pressure detection mode, after the first receipt of the frames transmitted by all of the transceivers 2, the controlling unit 32b of the receiver 3 further identifies, for the one of the frames which contains unregistered ID information indicative of the identification A, the wheel on which the transceiver 2 having transmitted the one of the frames is mounted as the FR wheel 6a. In other words, the controlling unit 32b identifies the transceiver A as being mounted on the FR wheel 6a.

Then, the controlling unit 32b of the receiver 3 registers in the memory thereof the ID information indicative of the identification A as the reference ID information associated with the FR wheel 6a.

The rest of operation of the tire inflation pressure detecting apparatus S2 is the same as that of the tire inflation pressure detecting apparatus S1 according to the previous embodiment; therefore, the description thereof is omitted here.

The tire inflation pressure detecting apparatus S2 according to the present embodiment has the same advantages as the tire inflation pressure detecting apparatus S1 according to the previous embodiment. Further, the tire inflation pressure detecting apparatus S2 has an additional advantage of being capable of accurately determining the locations of the transceivers 2 and thus those of the associated tires even when the output strength of the trigger signal is limited.

In addition, in the present embodiment, it is impossible for the receiver 3 to activate and deactivate the transceiver 2 on the FR wheel 6a via the trigger signal. Then, other methods may be used instead, such as configuring the transceivers 2 to include a motion sensor for sensing rotation of the associated tire and to be self-activated and self-deactivated based on the sensed rotation.

Third Embodiment

This embodiment illustrates a tire inflation pressure detecting apparatus S3 which has almost the same configuration as the tire inflation pressure detecting apparatus S1 according to the first embodiment. Accordingly, only the differences therebetween will be described hereinafter.

In the tire inflation pressure detecting apparatus S1, there is provided only the single triggering device 5. Further, the trigger signal transmitted by the triggering device 5 is received by all of the transceivers 2.

Figure 13:
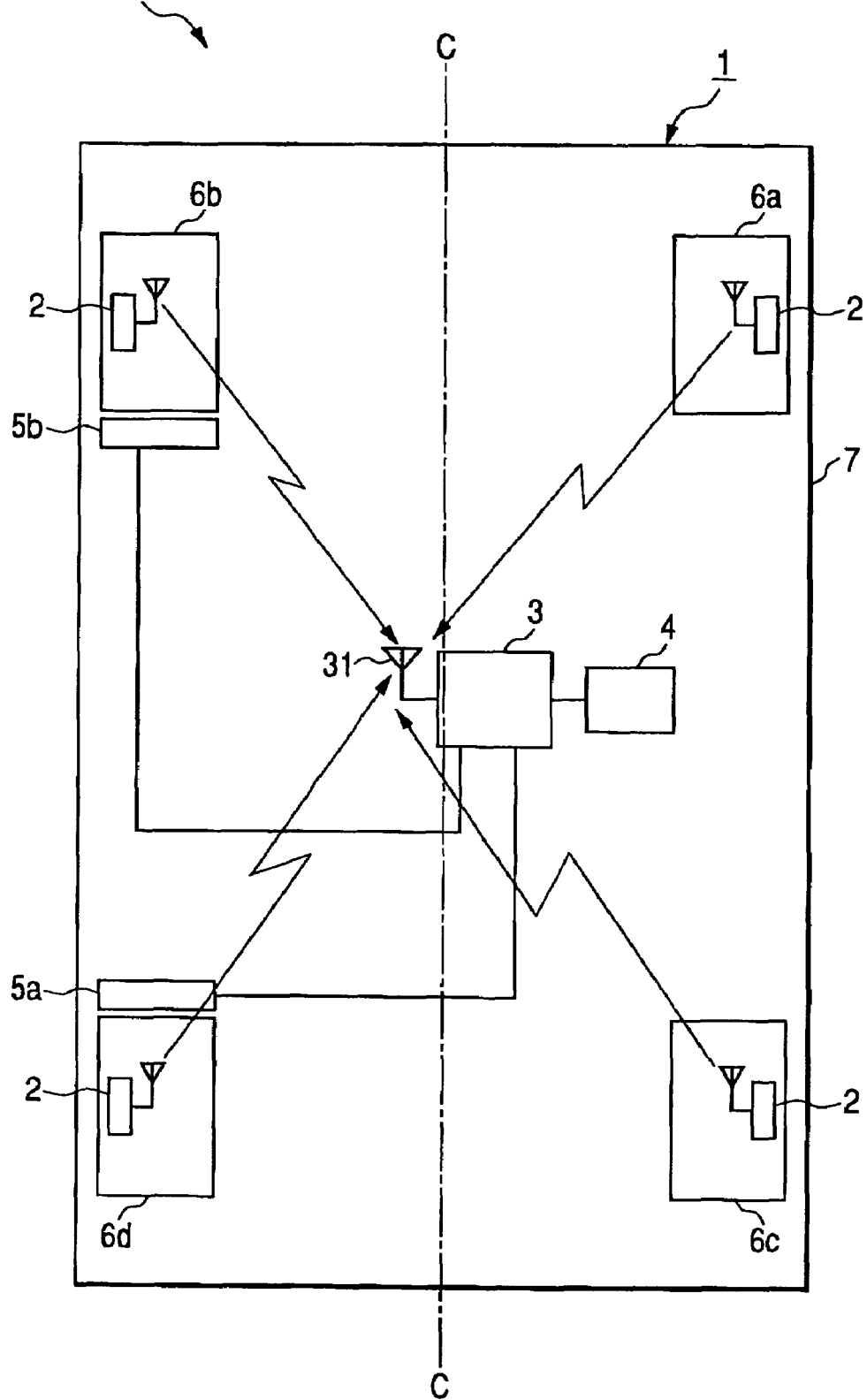
FIG. 13 is a schematic view showing the overall configuration of a tire inflation pressure detecting apparatus according to the third embodiment of the invention.

In comparison, referring to FIG. 13, in the tire inflation pressure detecting apparatus S3, there are provided two triggering devices 5a and 5b. Further, the trigger signal transmitted by each of the triggering devices 5a and 5b is received by only three of the transceivers 2.

Specifically, as shown in FIG. 13, the triggering device 5a is arranged in close vicinity to the RL wheel 6d, while the triggering device 5b is arranged in close vicinity to the FL wheel 6b. Consequently, both the triggering devices 5a and 5b are positioned on the left side of the longitudinal centerline C-C of the vehicle 1 at different distances from the wheels 6a-6d.

With the above arrangement, in the ID registration mode, the controlling unit 32b of the receiver 3 first outputs the command signal to one of the two triggering devices, for example, the triggering device 5a, thus causing the triggering device 5a to transmit the trigger signal.

As in the first embodiment, the strengths of the trigger signal transmitted by the triggering device 5a at the transceivers 2 are different from each other. Specifically, the strengths of the trigger signal transmitted by the triggering device 5a at the transceivers 2, which are respectively mounted on the wheels 6a-6d, decrease in the order of the RL wheel 6d, the RR wheel 6c, the FL wheel 6b, and the FR wheel 6a.

Figure 14A:
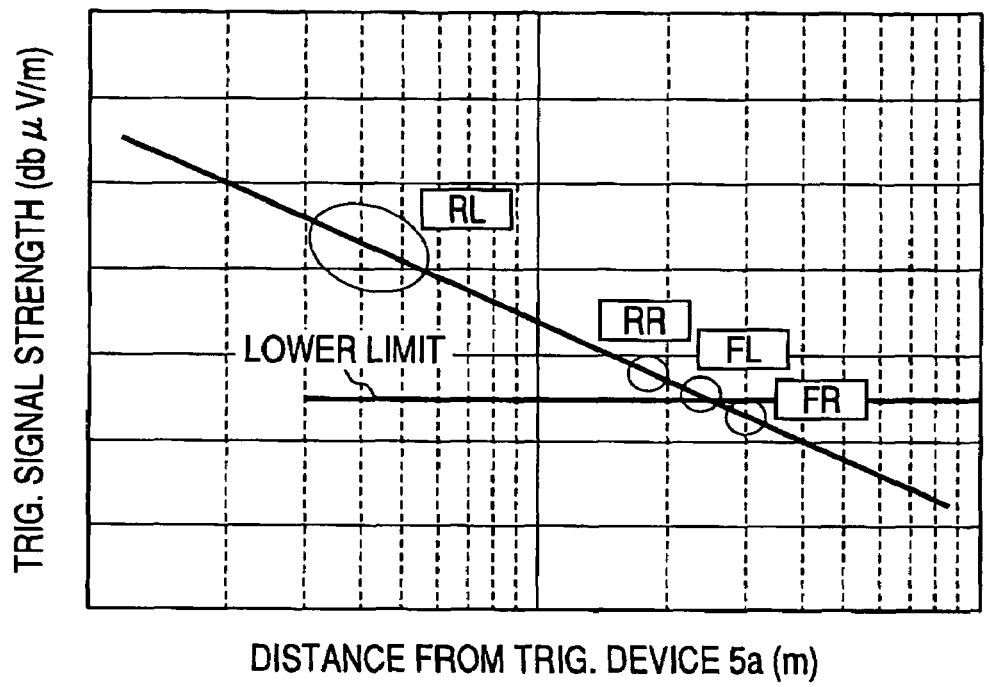
FIG. 14A is an application of FIG. 7 to the tire inflation pressure detecting apparatus of FIG. 13.

Thus, as shown in FIG. 14A, when the trigger signal is outputted by the triggering device 5a with the limited strength as in the second embodiment, the strength of the trigger signal at the transceiver 2 on the FR wheel 6a becomes lower than the lower limit of strength, so that the transceiver 2 on the FR wheel 6a cannot detect the trigger signal.

Further, since the difference between the distances from the triggering device 5a to the RR wheel 6c and to the FL wheel 6b is small, the difference between the strengths of the trigger signal at the transceivers 2 on the wheels 6c ant 6b is accordingly small. Consequently, in some practically cases, it may be difficult for the controlling unit 32b of the receiver 3 to distinguish the frames received from the transceivers 2 on the wheels 6c and 6b from one another based on the strengths of the trigger signal thereat.

In consideration of the above, in the present embodiment, the controlling unit 32b of the receiver 3 further outputs the command signal to the other of the two triggering devices, i.e., the triggering device 5b, thus causing the triggering device 5b to transmit the trigger signal.

Similar to the case of the trigger signal transmitted by the triggering device 5a, the strengths of the trigger signal transmitted by the triggering device 5b at the transceivers 2 are different from each other. Specifically, the strengths of the trigger signal transmitted by the triggering device 5b at the transceivers 2, which are respectively mounted on the wheels 6a-6d, decrease in the order of the FL wheel 6b, the FR wheel 6a, the RL wheel 6d, and the RR wheel 6c.

Figure 14B:
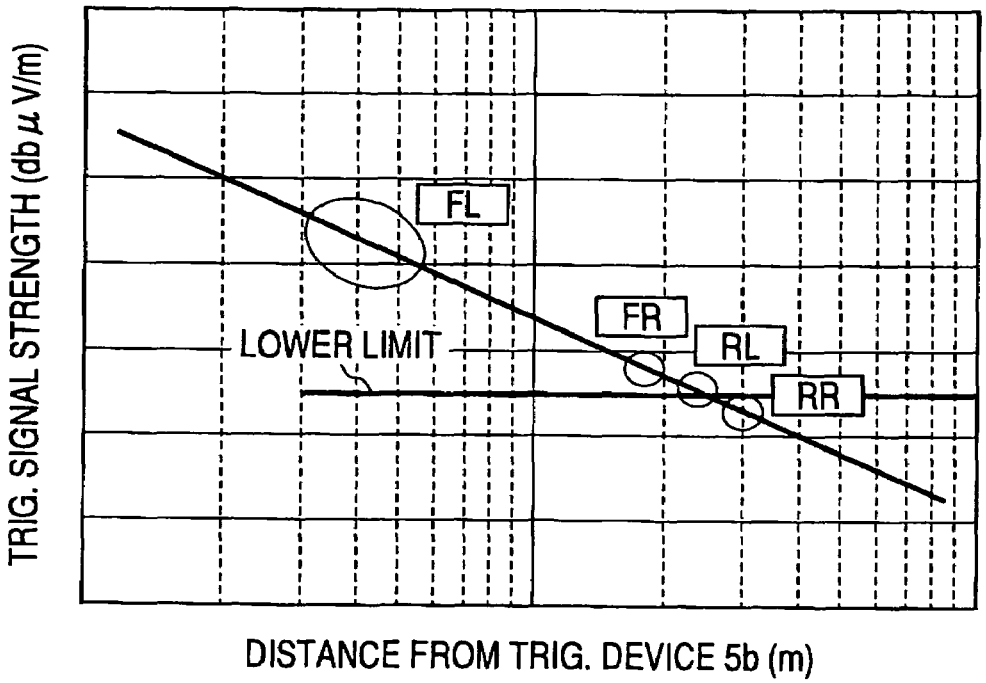
FIG. 14B is another application of FIG. 7 to the tire inflation pressure detecting apparatus of FIG. 13.

Thus, as shown in FIG. 14B, when the trigger signal is outputted by the triggering device 5b with the limited strength, the strength of the trigger signal at the transceiver 2 on the RR wheel 6c becomes lower than the lower limit of strength, so that the transceiver 2 on the RR wheel 6c cannot detect the trigger signal.

Further, since the difference between the distances from the triggering device 5b to the FR wheel 6a and to the RL wheel 6d is small, the difference between the strengths of the trigger signal at the transceivers 2 on the wheels 6a ant 6d is accordingly small. Consequently, in some practical cases, it may be difficult for the controlling unit 32b of the receiver 3 to distinguish the frames received from the transceivers 2 on the wheels 6a and 6d from one another based on the strengths of the trigger signal transmitted by the triggering device 5b thereat.

Accordingly, in the present embodiment, the controlling unit 32b of the receiver 3 identifies the locations of the transceivers 2 in three stages.

Specifically, in the first stage, the controlling unit 32b receives the frames that are transmitted by the transceivers 2 on the wheels 6d, 6c, and 6b in response to receipt of the trigger signal transmitted by the triggering device 5a. Then, the controlling unit 32b identifies the transceiver 2 which has transmitted the frame containing the signal strength information indicative of the maximum corrected strength as being mounted on the RL wheel 6d, and the other two transceivers 2 as being mounted on either of the RR wheel 6c and the FL wheel 6b.

In the second stage, the controlling unit 32b receives the frames that are transmitted by the transceivers 2 on the wheels 6b, 6a, and 6d in response to receipt of the trigger signal transmitted by the triggering device 5b. Then, the controlling unit 32b identifies the transceiver 2 which has transmitted the frame containing the signal strength information indicative of the maximum corrected strength as being mounted on the FL wheel 6*b*, and the other two transceivers 2 as being mounted on either of the FR wheel 6*a* and the RL wheel 6*d*.

In the third stage, the controlling unit 32*b* identifies the remaining unidentified transceivers 2. Specifically, among the two transceivers 2 that have been identified as being mounted on either of the RR wheel 6*c* and the FL wheel 6*b* in the first stage, since one of them has been identified as being mounted on the FL wheel 6*b* in the second stage, the other is accordingly identified as being mounted on the RR wheel 6*c*. Similarly, among the two transceivers 2 that have been identified as being mounted on either of the FR wheel 6*a* and the RL wheel 6*d* in the second stage, since one of them has been identified as being mounted on the RL wheel 6*d* in the first stage, the other is accordingly identified as being mounted on the FR wheel 6*a*.

Consequently, the locations of all the transceivers 2 on the vehicle 1 are identified by the controlling unit 32*b* of the receiver 3.

FIG. 15 illustrates an example of the above-described wheel identification process, where the transceivers 2 are respectively designated with their identifications A-D.

As shown in FIG. 15, the trigger signal transmitted by the triggering device 5*a* is received by the three transceivers C, D, and A and the corrected strengths of the trigger signal thereat are 55, 10, and 11, respectively.

Accordingly, in the first stage of the wheel identification process, the controlling unit 32*b* of the receiver 3 identifies the transceiver C as being mounted on the RL wheel 6*d*, and the other two transceivers D and A as being mounted on either of the RR wheel 6*c* and the FL wheel 6*b*.

Further, the trigger signal transmitted by the triggering device 5*b* is received by the three transceivers A, B, and C and the corrected strengths of the trigger signal thereat are 55, 10, and 13, respectively.

Accordingly, in the second stage of the wheel identification process, the controlling unit 32*b* of the receiver 3 identifies the transceiver A as being mounted on the FL wheel 6*b*, and the other two transceivers B and C as being mounted on either of the FR wheel 6*a* and the RL wheel 6*d*.

In the third stage of the wheel identification process, the controlling unit 32*b* of the receiver 3 identifies the transceiver D as being mounted on the RR wheel 6*c* and the transceiver B as being mounted on the FR wheel 6*a*.

The tire inflation pressure detecting apparatus S3 according to the present embodiment has the same advantages as the tire inflation pressure detecting apparatus S1 according to the first embodiment. Further, the tire inflation pressure detecting apparatus S3 has an additional advantage of being capable of accurately determining the locations of the transceivers 2 and thus those of the associated tires even when the output strength of the trigger signal is limited.

In addition, in the present embodiment, it is assumed that the trigger signal transmitted by each of the triggering devices 5*a* and 5*b* is receivable by only three of the transceivers 2. However, even in the case that the trigger signal is receivable by only two of the transceivers 2, it is still possible for the receiver 3 to accurately and easily determine the locations of the transceivers 2. Such a case may happen when the triggering devices 5*a* and 5*b* transmit the trigger signal with more limited strength or the transceivers 2 each have a lower receiver sensitivity.

Fourth Embodiment

This embodiment illustrates a tire inflation pressure detecting apparatus S4 which has almost the same configuration as the tire inflation pressure detecting apparatus S1 according to the first embodiment. Accordingly, only the differences therebetween will be described hereinafter.

In the tire inflation pressure detecting apparatus S1, each of the transceivers 2 receives the trigger signal transmitted by the triggering device 5 and transmits the frame containing the signal strength information indicative of the corrected strength of the trigger signal thereat; the receiver 3 identifies, for each of the frames received from the transceivers 2, the wheel on which the transceiver 2 having transmitted the frame is mounted based on the signal strength information contained in the frame.

In comparison, in the tire inflation pressure detecting apparatus S4, the transceivers 2 receive the trigger signal transmitted by the triggering device 5 and transmit the respective frames at different transmission times according to the corrected strengths of the trigger signal thereat; the receiver 3 thus receives the frames transmitted from the transceivers 2 at different reception times and identifies, for each of the received frames, the wheel on which the transceiver 2 having transmitted the frame is mounted based on the reception time at which the frame is received.

Specifically, upon receiving the trigger signal via the receiving antenna 25 and the receiving unit 22*c*, the controlling unit 22*a* of each of the transceivers 2 is activated to determine the strength of the trigger signal thereat and correct the determined strength of the trigger signal using the correction value Ec stored in the memory 22*d* thereof.

Then, the controlling unit 22*a* determines a transmission time according to the corrected strength of the trigger signal. For example, the transmission time may be determined by using a map that is stored in the memory 22*d* of the controlling unit 22*a* and represents a predefined relationship between the corrected strength of the trigger signal and the transmission time. Otherwise, the transmission time may be calculated as a function of the corrected strength of the trigger signal.

Since the corrected strengths of the trigger signal at the transceivers 2 are different from each other, the transmission times determined by the controlling units 22*a* of the transceivers 2 are accordingly different from each other.

After assembly of the frame that contains the ID information, the controlling unit 22*a* of each of the transceivers 2 transmits the frame at the determined transmission time.

Thus, the receiver 3 receives all the frames transmitted by the transceivers 2 at different reception times.

Then, the controlling unit 32*b* of the receiver 3 identifies, for each of the received frames, the wheel on which the transceiver 2 having transmitted the frame is mounted based on the reception time at which the frame is received.

For example, the controlling unit 32*b* may order the received frames according to the order of the reception times at which the frames are received, and then determines the locations of the transceivers 2 having transmitted the frames through matching the order of the frames with an order of the wheels 6*a*-6*d* which are made according to the distances from the triggering device 5 to the wheels 6*a*-6*d*. Otherwise, the controlling unit 32*b* may store in the memory thereof the same map or the same function as stored in the transceivers 2, inversely determine the corrected strengths of the trigger signal at the transceivers 2 based on the reception times at which the respective frames from the transceivers 2 are received, and determine the locations of the transceivers 2 based on the corrected strengths of the trigger signal thereat.

The rest of operation of the tire inflation pressure detecting apparatus S4 is the same as that of the tire inflation pressure detecting apparatus S1 according to the first embodiment; therefore, the description thereof is omitted here.

The tire inflation pressure detecting apparatus S4 according to the present embodiment has the same advantages as the tire inflation pressure detecting apparatus S1 according to the first embodiment.

Fifth Embodiment

This embodiment illustrates a tire inflation pressure detecting apparatus S5 which has a configuration similar to that of the tire inflation pressure detecting apparatus S1 according to the first embodiment. Accordingly, only the differences therebetween will be described hereinafter.

In the tire inflation pressure detecting apparatus S1, there is provided only the single triggering device 5. Further, the triggering device 5 transmits only the trigger signal in response to receipt of the command signal from the receiver 3, and the trigger signal is received by all of the transceivers 2. Moreover, the receiver sensitivity of each of the transceivers 2 is invariable.

Figure 16:
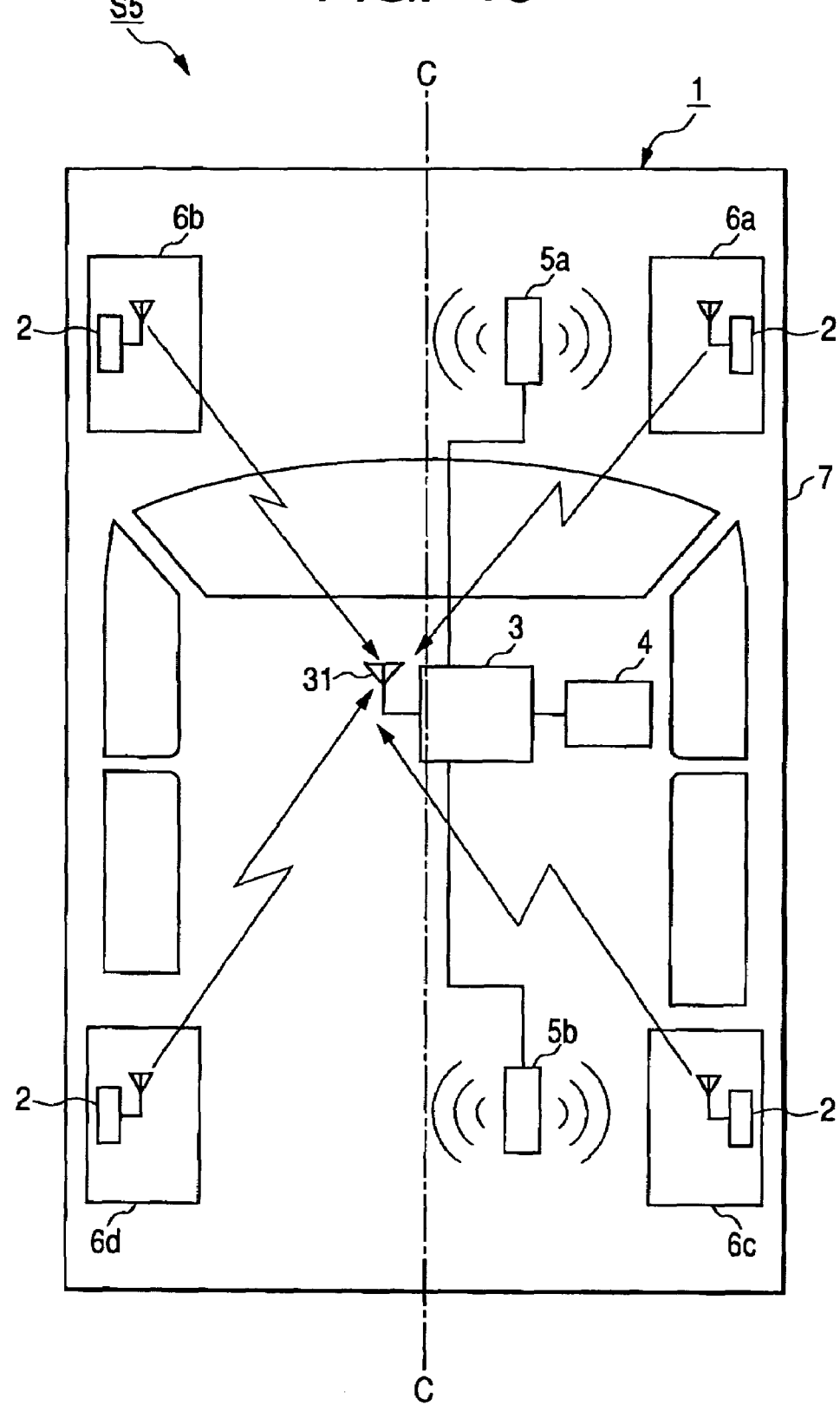
FIG. 16 is a schematic view showing the overall configuration of a tire inflation pressure detecting apparatus according to the fifth embodiment of the invention.

In comparison, referring to FIG. 16, in the tire inflation pressure detecting apparatus S5, there are provided two triggering devices 5a and 5b.

Specifically, as shown in FIG. 16, the triggering device 5a is arranged closer to the front wheels 6a and 6b than the rear wheels 6c and 6d, while the triggering device 5b is arranged closer to the rear wheels 6c and 6d than the front wheels 6a and 6b. Further, both the triggering devices 5a and 5b are positioned on the right side of the longitudinal centerline C-C of the vehicle 1. Accordingly, the triggering device 5a is closer to the FR wheel 6a than the FL wheel 6b, and the triggering device 5b is closer to the RR wheel 6c than the RL wheel 6d.

Further, in response to receipt of the command signal from the receiver 3, each of the triggering devices 5a and 5b transmits not only the trigger signal, but also a continuous carrier that consecutively follows the trigger signal. The trigger signal and the continuous carrier transmitted by the triggering device 5a are receivable only by the front wheels 6a and 6b, while those transmitted by the triggering device 5b are receivable only by the rear wheels 6c and 6d.

Moreover, in the present embodiment, the receiver sensitivity of each of the transceivers 2 is variable.

Figure 17:
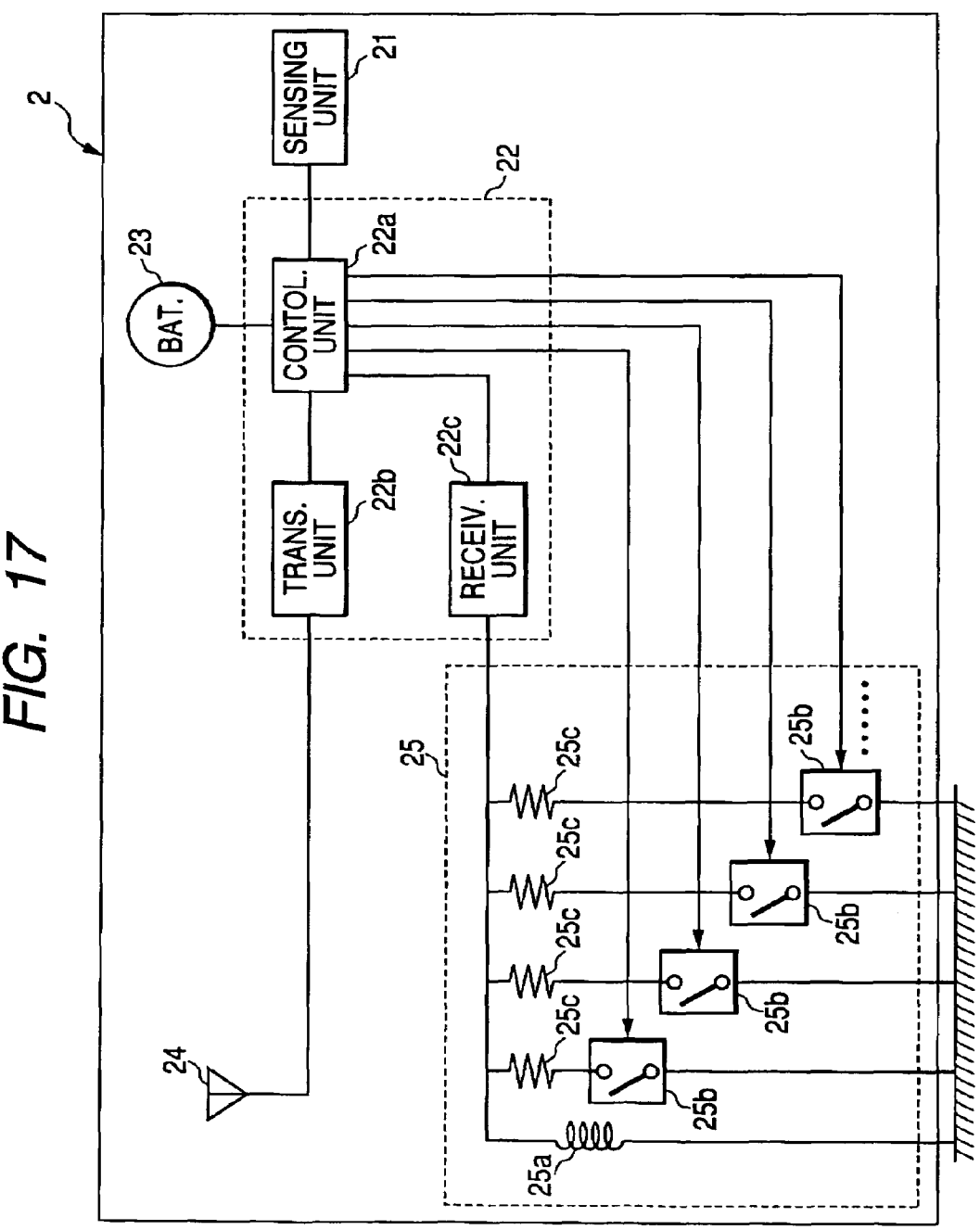
FIG. 17 is a functional block diagram showing the configuration of transceivers of the tire inflation pressure detecting apparatus of FIG. 16.

Specifically, referring to FIG. 17, in the tire inflation pressure detecting apparatus S5, the receiving antenna 25 of each of the transceivers 2 is configured to include an antenna element 25a and four pairs of a receiver sensitivity switch 25b and a damping resistor 25c. Further, each pair of the receiver sensitivity switch 25b and the damping resistor 25c is connected in parallel with the antenna element 25a.

With such a configuration, it is possible for the controlling unit 22a to control the number of the damping resistors 25c that are in actual electrical connection with the antenna element 25a through controlling on/off operation of the receiver sensitivity switches 25b. Further, through controlling the number of the damping resistors 25c that are in actual electrical connection with the antenna element 25a, it is possible for the controlling unit 22a to change the receiver sensitivity of the receiving antenna 25 in multiple stages.

On the other hand, the controlling unit 32b of the receiver 3 outputs the command signal to the triggering devices 5a and 5b, thereby causing them to consecutively transmit the trigger signal and the continuous carrier.

The continuous carrier is configured with a non-modulated signal and transmitted for a predetermined time period. The predetermined time period is so set as to be long enough for the transceivers 2 to detect the continuous carrier multiple times.

In response to receipt of the trigger signal transmitted by a corresponding one of the triggering devices 5a and 5b, the controlling unit 22a of each of the transceivers 2 changes the receiver sensitivity of the receiving antenna 25 from a highest value to a lowest value in multiple stages and determines from which stage it becomes impossible to detect the continuous carrier that consecutively follows the trigger signal.

Specifically, referring to FIG. 17, the receiver sensitivity of the receiving antenna 25 has the highest value when all of the receiver sensitivity switches 25b are off and the lowest value when all of them are on. The receiver sensitivity of the receiving antenna 25 can be gradually changed from the highest value to the lowest value in four stages.

Since the triggering devices 5a and 5b are located at different distances from the transceivers 2, the strengths of the continuous carriers at the transceivers 2 are different from each other. Accordingly, for the transceivers 2, the stages from which it becomes impossible for them to detect the continuous carriers are different from each other. In other words, the numbers of times the continuous carriers are detected by the transceivers 2 during the change in the receiver sensitivities thereof are different from each other. Accordingly, it is possible for the receiver 3 to determine the locations of the transceivers 2 based on the numbers of times the continuous carriers are detected by the transceivers 2 during the change in the receiver sensitivities thereof.

To accurately determine the locations of the transceivers 2 in this way, it is essential that all the transceivers 2 have the same receiver sensitivity. However, due to manufacturing tolerances, there generally exist slight differences in receiver sensitivity among the transceivers 2. Therefore, to ensure the accuracy of the determination, it is necessary for each of the transceivers 2 to determine a correction value Ecv of the receiver sensitivity thereof.

The correction value Ecv is predetermined and stored in each of the transceivers 2 by using the same correction apparatus 8 as in the first embodiment. Moreover, the process of the correction apparatus 8 for determination of the correction value Ecv is the same as that for determination of the correction value Ec in the first embodiment. Accordingly, the description of configuration and process of the correction apparatus 8 is omitted here.

Figure 18:
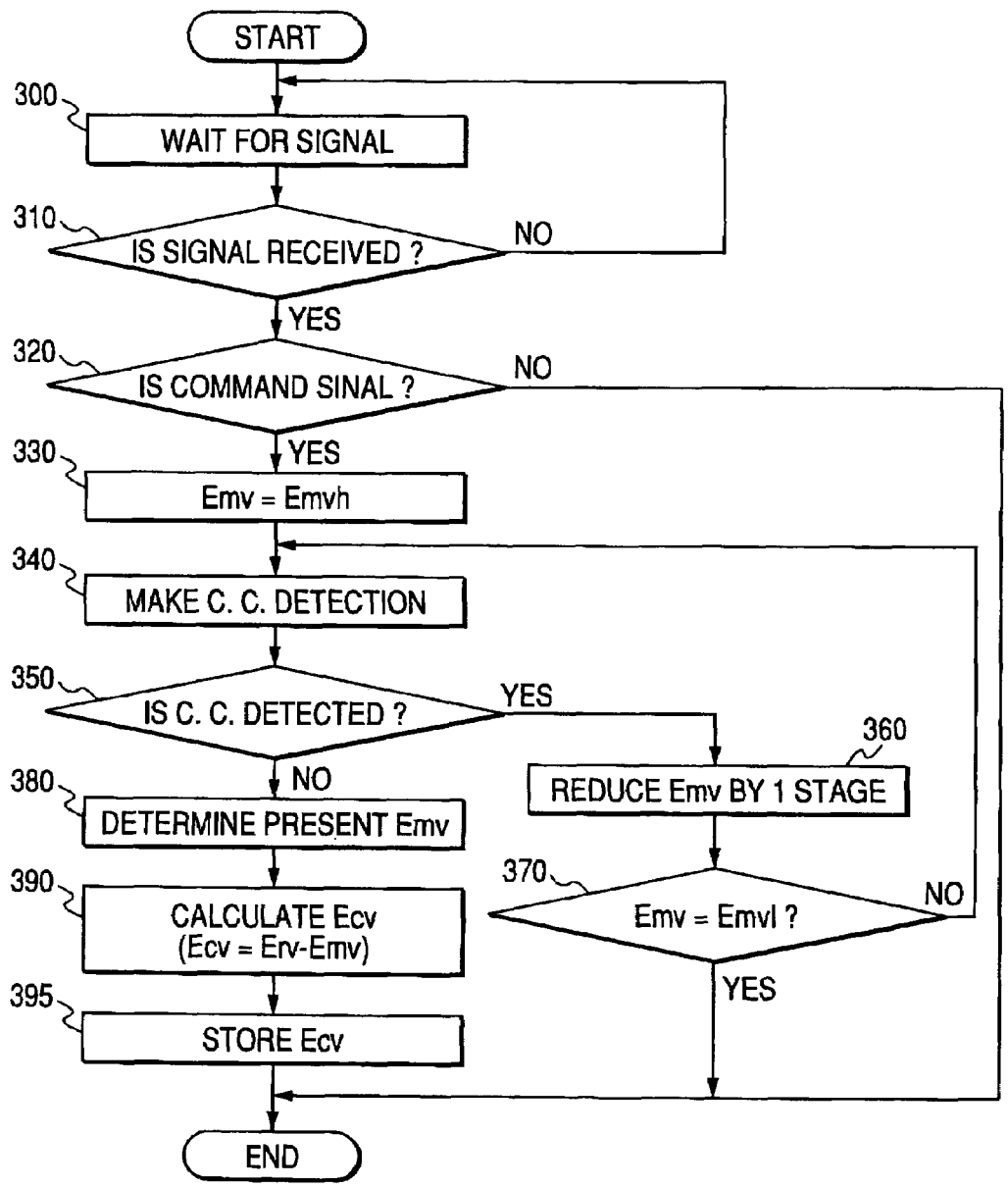
FIG. 18 is a flow chart showing a correction value determination process of each of the transceivers of FIG. 17.

FIG. 18 shows the process of the controlling unit 22a of each of the transceivers 2 for determining the correction value Ecv of the transceiver 2.

First, at the step 300, the controlling unit 22a waits for arrival of the command signal from the correction apparatus 8.

At the step 310, the controlling unit 22a determines whether a signal is received thereby.

If the determination at the step 310 produces a "NO" answer, then the process returns to the step 300.

Otherwise, if the determination at the step 310 produces a "YES" answer, then the process proceeds to the step 320.

At the step 320, the controlling unit 22a makes a further determination as to whether the received signal is the command signal transmitted by the correction apparatus 8 which indicates the correction value determination command.

If the determination at the step 320 produces a "NO" answer, then the process directly goes to the end.

Otherwise, if the determination at the step 320 produces a "YES" answer, then the process proceeds to the step 330.

At the step 330, the controlling unit 22a sets the receiver sensitivity Emv of the transceiver 2 to the highest value Emvh.

At the step 340, the controlling unit 22a makes a detection of the continuous carrier that is transmitted by the correction apparatus 8 consecutively following the command signal.

At the succeeding step 350, the controlling unit 22a checks whether the continuous carrier is detected thereby.

If the check at the step 350 produces a "YES" answer, then the process proceeds to the step 360.

At the step 360, the receiver sensitivity Emv of the transceiver 2 is reduced (or lowered) by one stage.

At the succeeding step 370, the controlling unit 22a determines whether the receiver sensitivity Emv of the transceiver 2 is reduced to the lowest value Emvl.

If the determination at the step 370 produces a "NO" answer, then the process returns to the step 340.

Otherwise, if the determination at the step 370 produces a "YES" answer, then the process directly goes to the end.

On the other hand, if the check at the step 350 produces a "NO" answer, then the process proceeds to the step 380.

At the step 380, the controlling unit 22a determines the actual value of the receiver sensitivity Emv of the transceiver 2 at the present stage.

At the succeeding step 390, the controlling unit 22a calculates the correction value Ecv as the difference between a reference value Erv and the determined actual value of the receiver sensitivity Emv. The reference value Erv is previously stored in the memory 22d (not shown in FIG. 17) of the controlling unit 22a.

At the step 395, the controlling unit 22a stores the calculated correction value Ecv in the memory 22d thereof, and then completes the process.

As above, in the present embodiment, each of the transceivers 2 has determined and stored therein the correction value Ecv of the receiver sensitivity thereof.

In addition, it is inconceivable that the determination at the step 370 would result in a "YES" answer. If such a case occurs, the correction value Ecv could be calculated as the difference between the reference value and the actual value of the receiver sensitivity Emv of the transceiver 2 at the lowest stage of the change in the receiver sensitivity Emv.

After having described the overall configuration of the tire inflation pressure detecting apparatus S5, operation thereof will be described hereinafter with reference to FIGS. 19 and 20, which respectively illustrate the processes of the receiver 3 and the transceivers 2 during the operation.

When the ignition switch (not shown) of the vehicle 1 is turned from off to on, the receiver 3 and the triggering devices 5a and 5b are supplied with electric power from the battery on the vehicle 1, thus entering the ID registration mode.

Figure 19:
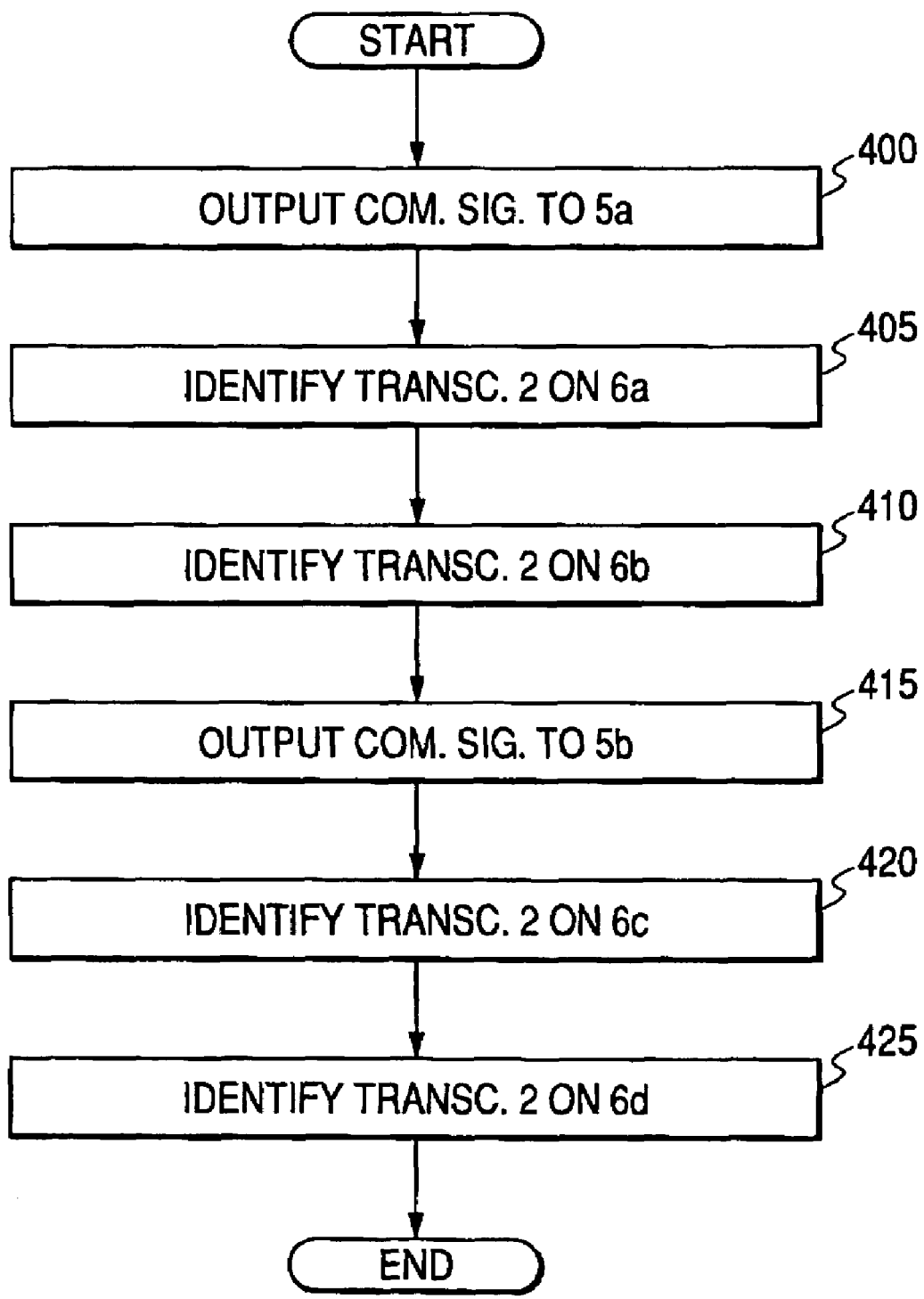
FIG. 19 is a flow chart showing a wheel identification process of a receiver of the tire inflation pressure detecting apparatus of FIG. 16.

Then, the receiver 3 outputs the command signal to the triggering device 5a, as indicated at the step 400 in FIG. 19.

In response to receipt of the command signal, the triggering device 5a consecutively transmits the trigger signal and the continuous carrier with predetermined strength.

Figure 20:
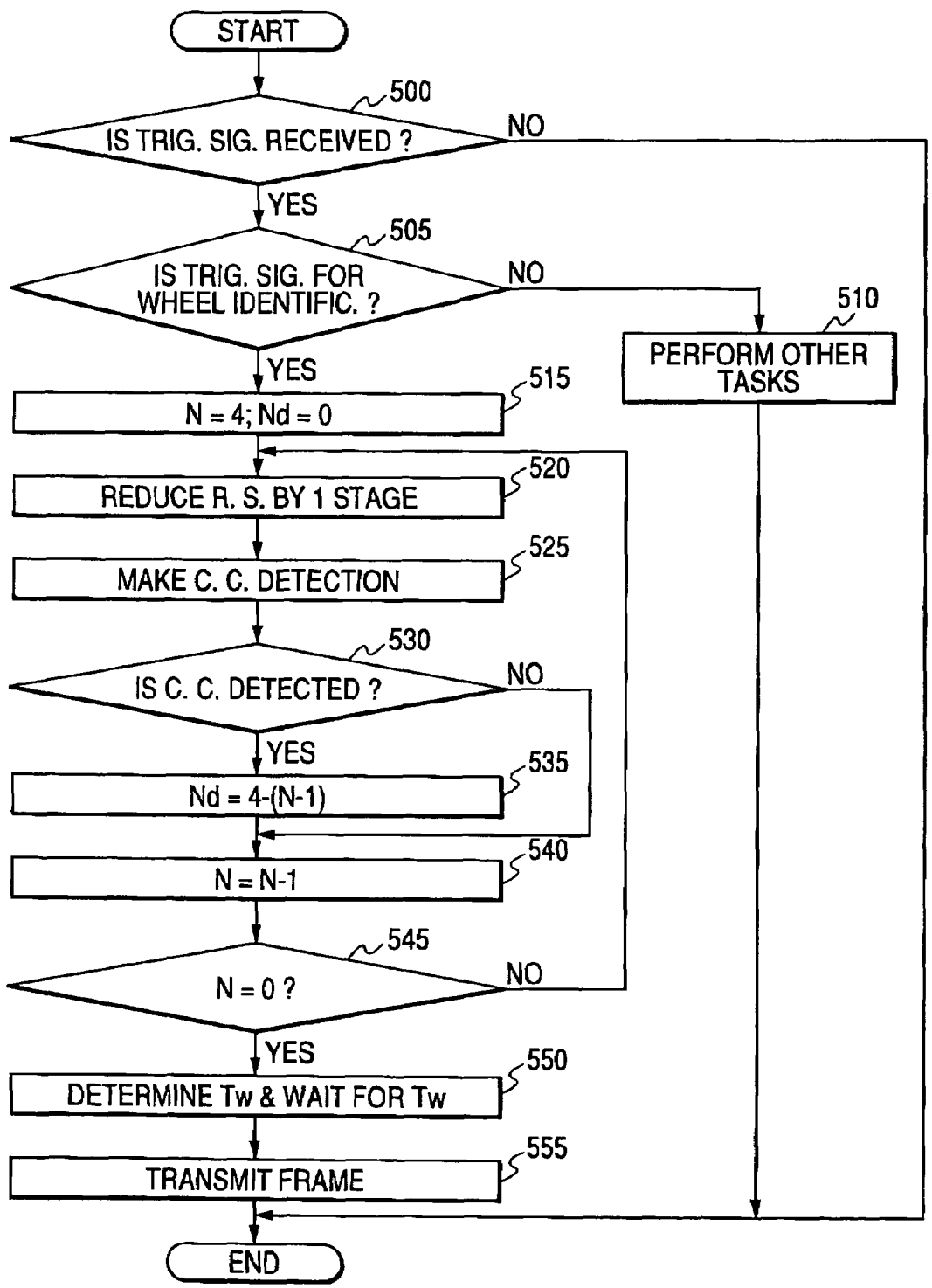
FIG. 20 is a flow chart showing a wheel identification process of each of the transceivers of the tire inflation pressure detecting apparatus of FIG. 16.

On the other hand, each of the transceivers 2 makes a check on whether the trigger signal is received thereby, as indicated at the step 500 of FIG. 20.

If the check at the step 500 results in a "NO" answer, then the process directly goes to the end.

Otherwise, if the check at the step 500 produces a "YES" answer, then the process proceeds to the step 505.

Since the receiver sensitivity of each of the transceivers 2 has the highest value at this stage, the trigger signal that is transmitted by the triggering device 5a with the predetermined strength is received by both the transceivers 2 on the front wheels 6a and 6b, and thus the process proceeds to the step 505 in those transceivers 2.

At the step 505, a determination is made as to whether the received trigger signal indicates an instruction for wheel identification.

If the determination at the step 505 results in a "NO" answer, then the process goes to the step 510.

At the step 510, a predetermined task is performed according to the instruction; the process then goes to the end.

Otherwise, if the determination at the step 505 produces a "YES" answer, then the process proceeds to the step 515.

At the step 515, a parameter N is set to 4 and a parameter Nd is set to 0 (zero). Here, the parameter N is set to be equal to the number of stages of the change in the receiver sensitivity. The parameter Nd represents the number of times the continuous carrier is detected during the change in the receiver sensitivity.

At the step 520, the receiver sensitivity of each of the transceivers 2 is reduced by one stage.

Specifically, the controlling unit 22a of each of the transceivers 2 outputs the sensitivity-down command signal to the receiving antenna 25, which causes one of the receiver sensitivity switches 25b to be turned from off to on, thereby bring a corresponding one of the damping resistors 25c into parallel electrical connection with the antenna element 25a.

At the step 525, each of the transceivers 2 makes a detection of the continuous carrier that is transmitted consecutively following the trigger signal.

At the step 530, each of the transceivers 2 checks whether the continuous carrier is detected thereby.

If the check at the step 530 produces in a "YES" answer, then the process proceeds to the step 535.

At the step 535, the parameter Nd is set to (4−(N−1)); the process then proceeds to the step 540.

Otherwise, if the check at the step 530 results in a "NO" answer, then the process directly goes to the step 540, without changing the value of the parameter Nd.

At the step 540, the parameter N is reduced by 1.

At the step 545, a check is made on whether the parameter N is equal to 0 (zero).

If the check at the step 545 results in a "NO" answer, then the process returns to the step 520.

Otherwise, if the check at the step 545 produces a "YES" answer, then the process proceeds to the step 550.

Through repeatedly performing the above steps 520-545, the receiver sensitivity of each of the transceivers 2 is decreased from the highest value to the lowest value in four stages, and the number of times the continuous carrier is detected by each of the transceivers 2 during the change in the receiver sensitivity (i.e., Nd) is determined.

At the step 550, each of the transceivers 2 determines a waiting time Tw and waits for the determined waiting time Tw.

Specifically, each of the transceivers 2 first corrects the number of times the continuous carrier is detected thereby (i.e., Nd) using the correction value Ecv thereof, and determines the waiting time Tw by substituting the corrected number of times Nd' into the following equation:

$$Tw = ((4 - Nd')) \times Tr$$

where Tr is a time required for the transceivers 2 to complete one frame transmission.

The corrected number of times Nd' can be considered as the number of times the continuous carrier would be detected by each of the transceivers 2 if the transceiver 2 has a reference (or standard) receiver sensitivity. Thus, using the corrected number of times Nd', it is possible to suitably set the waiting time Tw for each of the transceivers 2 even if there exist differences in receiver sensitivity among the transceivers 2.

After waiting for Tw, at the step 555, each of the transceivers 2 transmits the frame which contains ID information indicative of the identification of the transceiver 2. Then, the process goes to the end.

Through performing the above steps 550 and 555, the transceivers 2 on the front wheels 6a and 6b transmit the respective frames at different transmission times. Specifically, since the triggering device 5a is closer to the FR wheel 6a than the FL wheel 6b, the strength of the continuous carrier at the transceiver 2 on the FR wheel 6a is higher than that at the transceiver 2 on the FL wheel 6b. Accordingly, Nd' for the transceiver 2 on the FR wheel 6a is greater than that for the transceiver 2 on the FL wheel 6b, and Tw for the transceiver 2 on the FR wheel 6a is thus shorter than that for the transceiver 2 on the FL wheel 6b.

Consequently, the transmission time for the transceiver 2 on the FR wheel 6a is earlier than that for the transceiver 2 on the FL wheel 6b; thus the receiver 3 will receive the frame transmitted by the transceiver 2 on the FR wheel 6a first and then receive the frame transmitted by the transceiver 2 on the FL wheel 6b.

Turning back to FIG. 19, at the step 405, the receiver 3 first receives one of the frames transmitted by the transceivers 2 on the front wheels 6a and 6b and identifies the transceiver 2 having transmitted the first received frame as being mounted on the FR wheel 6a. Then, the receiver 3 stores in the memory thereof the ID information contained in the first received frame as reference ID information associated with the FR wheel 6a.

At the step 410, the receiver 3 secondly receives the other of the frames transmitted by the transceivers 2 on the front wheels 6a and 6b and identifies the transceiver 2 having transmitted the secondly received frame as being mounted on the FL wheel 6b. Then, the receiver 3 stores in the memory thereof the ID information contained in the secondly received frame as reference ID information associated with the FL wheel 6b.

At the succeeding step 415, the receiver 3 outputs the command signal to the triggering device 5b.

In response to receipt of the command signal, the triggering device 5b consecutively transmits the trigger signal and the continuous carrier with the predetermined strength.

Upon receipt of the trigger signal transmitted by the triggering device 5b, the transceivers 2 on the rear wheels 6c and 6d perform, as the transceivers 2 on the front wheels 6a and 6b, the process indicated in FIG. 20. Consequently, the transceivers 2 on the rear wheels 6c and 6d transmit the respective frames at different transmission times.

Then, as indicated at the step 420 of FIG. 19, the receiver 3 thirdly receives one of the frames transmitted by the transceivers 2 on the rear wheels 6c and 6d and identifies the transceiver 2 having transmitted the thirdly received frame as being mounted on the RR wheel 6c. Thereafter, the receiver 3 stores in the memory thereof the ID information contained in the thirdly received frame as reference ID information associated with the RR wheel 6c.

At the step 425, the receiver 3 fourthly receives the other of the frames transmitted by the transceivers 2 on the rear wheels 6c and 6d and identifies the transceiver 2 having transmitted the fourthly received frame as being mounted on the RL wheel 6d. Then, the receiver 3 stores in the memory thereof the ID information contained in the fourthly received frame as reference ID information associated with the RL wheel 6d.

After the step 425, the wheel identification process of the receiver 3 goes to the end.

Then, the operation of the tire inflation pressure detecting apparatus S5 is shifted from the ID registration mode to the tire pressure detection mode.

The tire pressure detection mode of the tire inflation pressure detecting apparatus S5 is the same as that of the tire inflation pressure detecting apparatus S1; accordingly, the description thereof is omitted here.

The above-described wheel identification process according to the present embodiment may be understood more fully from FIG. 21, in which only the wheel identification for the transceivers 2 on the front wheels 6a and 6b is illustrated.

As shown in FIG. 21, the triggering device 5a consecutively transmits the trigger signal and the continuous carrier.

Then, both the transceivers 2 on the front wheels 6a and 6b receive the trigger signal and change the receiver sensitivities (R. S.) thereof in four stages in response to receipt of the trigger signal.

At each stage of the change in the receiver sensitivity, each of the transceivers 2 checks whether the continuous carrier is detected thereby and counts the number of times the continuous carrier is detected thereby (i.e., Nd).

After the change in the receiver sensitivity, each of the transceivers 2 corrects the number of times Nd using the correction value Ecv thereof, resulting in the corrected number of times Nd'.

Since the triggering device 5a is closer to the FR wheel 6a than the FL wheel 6b, Nd' for the transceiver 2 on the FR wheel 6a is, for example, three, while Nd' for the transceiver 2 on the FL wheel 6b is, for example, one.

Thus, the waiting time Tw for the transceiver 2 on the FR wheel 6a is set to be shorter than that for the transceiver 2 on the FL wheel 6b.

Consequently, the transceivers 2 transmit the respective frames at different transmission times, so that the receiver 3 receives the frames at different reception times and identify, for each of the received frames, the wheel on which the transceiver 2 having transmitted the frame is mounted based on the reception time at which the frame is received.

The tire inflation pressure detecting apparatus S5 according to the present embodiment has the same advantages as the tire inflation pressure detecting apparatus S1 according to the first embodiment.

In addition, the above-described configuration of the tire inflation pressure detecting apparatus S5 may be modified such that: each of the transceivers 2 transmits the frame which contains data representing the corrected number of times Nd'; the receiver 3 identifies, for each of the frames received from the transceivers 2, the wheel on which the transceiver 2 having transmitted the frame is mounted based on the data contained in the frame.

Further, on the basis of the above modified configuration, all the frames transmitted by the transceivers 2 may contain the same size of data, and the transceivers 2 may repeatedly transmit the respective frames a plurality of times at different time intervals. As a result, the receiver 3 can more reliably receive all the frames transmitted by the transceivers 2 without interference of the frames thereat.

Other Embodiments

While the above particular embodiments of the invention have been shown and described, it will be understood by those who practice the invention and those skilled in the art that various modifications, changes, and improvements may be made to the invention without departing from the spirit of the disclosed concept.

For example, in the previous embodiments, the receiver 3 includes only the single receiving antenna 31 to receive all the frames transmitted by the transceivers 2.

However, the receiver 3 may also have a different number of receiving antennas 31. For example, the receiver 3 may include four receiving antennas 31, each of which corresponds to one of the four transceivers 2.

It is to be appreciated that the present invention is especially effective in case that the receiver 3 includes only the single receiving antenna 31 and thus it is difficult for the receiver 3 to distinguish the frames received via the common receiving antenna 31 from one another.

In the third embodiment of the invention, the triggering devices 5a and 5b are arranged on the same side of the longitudinal centerline of the vehicle 1.

However, the triggering devices 5a and 5b may also be arranged on the same side of the lateral centerline of the vehicle 1. For example, the triggering device 5b may be arranged in close vicinity to the RR wheel 6c, while the triggering device 5a is arranged in close vicinity to the RL wheel 6d. In this case, it is still possible for the receiver 3 to accurately determine the locations of the transceivers 2 in the same way as in the third embodiment.

In the fifth embodiment of the invention, the triggering device 5a is employed for the wheel identification for the transceivers 2 on the front wheels 6a and 6b, while the triggering device 5b is employed for the wheel identification for the transceivers 2 on the rear wheels 6c and 6d.

However, the triggering device 5a may be located in the vicinity of the right wheels 6a and 6c at different distances from the FR wheel 6a and the RR wheel 6c for the wheel identification for the transceivers 2 on the right wheels 6a and 6c, and the triggering device 5b may be located in the vicinity of the left wheels 6b and 6d at different distances from the FL wheel 6b and the RL wheel 6d for the wheel identification for the transceivers 2 on the left wheels 6b and 6d.

Further, in the fifth embodiment of the invention, the wheel identification for all the transceivers 2 on the wheels 6a-6d may be carried out by employing only a single triggering device. In this case, however, it is necessary that the single triggering device is located at different distances from all the transceivers 2 and at least three of the transceivers 2 can receive the trigger signal transmitted by the triggering device and transmit the respective frames in response to receipt of the trigger signal.

Furthermore, in the fifth embodiment of the invention, the variable receiver sensitivities of the transceivers 2 are obtained by employing the damping resistors 25.

However, instead of employing the damping resistors 25, an amplifier may be employed in the receiving unit 22c of each of the transceivers 2, so that the receiver sensitivity of the transceiver 2 can be varied through varying the gain of the amplifier.

Such modifications, changes, and improvements are possible within the scope of the appended claims.

What is claimed is:

1. A wheel identifying apparatus comprising:
   a first and a second transceiver which are respectively located on a first and a second wheel of a vehicle, each of the transceivers working to receive a trigger signal and transmit a response signal in response to receipt of the trigger signal;
   a triggering device working to transmit the trigger signal, the triggering device being located on a body of the vehicle at different distances from the transceivers, so that strengths of the trigger signal at the transceivers are different from each other;
   a receiver working to receive the response signals transmitted by the transceivers; and
   a wheel identifier operatively connected to the receiver, the wheel identifier working to identify, for each of the response signals received by the receiver, the wheel on which the transceiver having transmitted the response signal is located,
   wherein,
   each of the transceivers has a correction value according to a receiver sensitivity thereof,
   upon receipt of the trigger signal transmitted by the triggering device, each of the transceivers determines the strength of the trigger signal thereat, corrects the determined strength of the trigger signal using the correction value thereof, and transmits the response signal which conveys signal strength information indicative of the corrected strength of the trigger signal, and
   the wheel identifier identifies, for each of the response signals received by the receiver, the wheel on which the transceiver having transmitted the response signal is located based on the signal strength information conveyed by the response signal.

2. The wheel identifying apparatus as set forth in claim 1, wherein,
   the triggering device outputs the trigger signal with such a low strength that one of the first and second transceivers cannot detect the trigger signal and thus no response signal is transmitted by the one of the first and second transceivers, and
   the wheel identifier identifies the wheel on which the one of the first and second transceivers is located as the one of the first and second wheels which is farther from the triggering device than the other.

3. The wheel identifying apparatus as set forth in claim 1, wherein each of the transceivers corrects the determined strength of the trigger signal by adding the correction value thereof to the determined strength of the trigger signal.

4. The wheel identifying apparatus as set forth in claim 1, wherein the receiver and the wheel identifier are located on the body of the vehicle and integrated into a single device.

5. A tire inflation pressure detecting apparatus comprising:
   a first and a second pressure sensor which are respectively located on a first and a second wheel of a vehicle, each of the pressure sensors working to sense inflation pressure of an associated one of tires fitted on the first and second wheels and output tire pressure information indicative of the sensed inflation pressure of the associated tire;
   a first and a second transceiver which are respectively located on the first and second wheels of the vehicle, each of the transceivers working to receive a trigger signal and transmit a response signal, which conveys the tire pressure information outputted by an associated one of the first and second pressure sensors, in response to receipt of the trigger signal;
   a triggering device working to transmit the trigger signal, the triggering device being located on a body of the vehicle at different distances from the transceivers, so that strengths of the trigger signal at the transceivers are different from each other;
   a receiver working to receive the response signals transmitted by the transceivers;
   a wheel identifier operatively connected to the receiver, the wheel identifier working to identify, for each of the response signals received by the receiver, the wheel on which the transceiver having transmitted the response signal is located; and a tire pressure determiner operatively connected to the receiver and the wheel identifier, the tire pressure determiner working to determine, for each of the response signals received by the receiver, the inflation pressure of the tire that is located on the same wheel as the transceiver having transmitted the response signal based on the tire pressure information conveyed by the response signal, wherein, each of the transceivers has a correction value according to a receiver sensitivity thereof, upon receipt of the trigger signal transmitted by the triggering device, each of the transceivers determines the strength of the trigger signal thereat, corrects the determined strength of the trigger signal using the correction value thereof, and transmits the response signal which conveys signal strength information indicative of the corrected strength of the trigger signal along with the tire pressure information, and the wheel identifier identifies, for each of the response signals received by the receiver, the wheel on which the transceiver having transmitted the response signal is located based on the signal strength information conveyed by the response signal.

6. The tire inflation pressure detecting apparatus as set forth in claim 5, wherein the first and second pressure sensors are respectively integrated into the first and second transceivers, and the receiver, the wheel identifier, and the tire pressure determiner are located on the body of the vehicle and integrated into a single device.

7. A wheel identifying apparatus comprising:

a first and a second transceiver which are respectively located on a first and a second wheel of a vehicle, each of the transceivers working to receive a trigger signal and transmit a response signal in response to receipt of the trigger signal;

a triggering device working to transmit the trigger signal, the triggering device being located on a body of the vehicle at different distances from the transceivers, so that strengths of the trigger signal at the transceivers are different from each other;

a receiver working to receive the response signals transmitted by the transceivers; and a wheel identifier operatively connected to the receiver, the wheel identifier working to identify, for each of the response signals received by the receiver, the wheel on which the transceiver having transmitted the response signal is located, wherein, each of the transceivers has a correction value according to a receiver sensitivity thereof, upon receipt of the trigger signal transmitted by the triggering device, each of the transceivers determines the strength of the trigger signal thereat, corrects the determined strength of the trigger signal using the correction value thereof, determines a transmission time according to the corrected strength of the trigger signal, and transmits the response signal at the determined transmission time, the receiver receives the response signals transmitted by the transceivers at different reception times, and the wheel identifier identifies, for each of the response signals received by the receiver, the wheel on which the transceiver having transmitted the response signal is located based on the reception time at which the response signal is received by the receiver.

8. The wheel identifying apparatus as set forth in claim 7, wherein, the triggering device outputs the trigger signal with such a low strength that one of the first and second transceivers cannot detect the trigger signal and thus no response signal is transmitted by the one of the first and second transceivers, and the wheel identifier identifies the wheel on which the one of the first and second transceivers is located as the one of the first and second wheels which is farther from the triggering device than the other.

9. The wheel identifying apparatus as set forth in claim 7, wherein each of the transceivers corrects the determined strength of the trigger signal by adding the correction value thereof to the determined strength of the trigger signal.

10. The wheel identifying apparatus as set forth in claim 7, wherein the receiver and the wheel identifier are located on the body of the vehicle and integrated into a single device.

11. A tire inflation pressure detecting apparatus comprising:

a first and a second pressure sensor which are respectively located on a first and a second wheel of a vehicle, each of the pressure sensors working to sense inflation pressure of an associated one of tires fitted on the first and second wheels and output tire pressure information indicative of the sensed inflation pressure of the associated tire;

a first and a second transceiver which are respectively located on the first and second wheels of the vehicle, each of the transceivers working to receive a trigger signal and transmit a response signal, which conveys the tire pressure information outputted by an associated one of the first and second pressure sensors, in response to receipt of the trigger signal;

a triggering device working to transmit the trigger signal, the triggering device being located on a body of the vehicle at different distances from the transceivers, so that strengths of the trigger signal at the transceivers are different from each other;

a receiver working to receive the response signals transmitted by the transceivers;

a wheel identifier operatively connected to the receiver, the wheel identifier working to identify, for each of the response signals received by the receiver, the wheel on which the transceiver having transmitted the response signal is located; and a tire pressure determiner operatively connected to the receiver and the wheel identifier, the tire pressure determiner working to determine, for each of the response signals received by the receiver, the inflation pressure of the tire that is located on the same wheel as the transceiver having transmitted the response signal based on the tire pressure information conveyed by the response signal, wherein, each of the transceivers has a correction value according to a receiver sensitivity thereof, upon receipt of the trigger signal transmitted by the triggering device, each of the transceivers determines the strength of the trigger signal thereat, corrects the determined strength of the trigger signal using the correction value thereof, determines a transmission time according to the corrected strength of the trigger signal, and transmits the response signal at the determined transmission time, the receiver receives the response signals transmitted by the transceivers at different reception times, and the wheel identifier identifies, for each of the response signals received by the receiver, the wheel on which the transceiver having transmitted the response signal is located based on the reception time at which the response signal is received by the receiver.

12. The tire inflation pressure detecting apparatus as set forth in claim 11, wherein the first and second pressure sensors are respectively integrated into the first and second transceivers, and the receiver, the wheel identifier, and the tire pressure determiner are located on the body of the vehicle and integrated into a single device.

13. A wheel identifying apparatus comprising:
a first and a second transceiver which are respectively located on a first and a second wheel of a vehicle, each of the transceivers working to receive a trigger signal and transmit a response signal in response to receipt of the trigger signal;
a triggering device working to transmit the trigger signal, the triggering device being located on a body of the vehicle at different distances from the transceivers, so that strengths of the trigger signal at the transceivers are different from each other;
a receiver working to receive the response signals transmitted by the transceivers; and
a wheel identifier operatively connected to the receiver, the wheel identifier working to identify, for each of the response signals received by the receiver, the wheel on which the transceiver having transmitted the response signal is located,
wherein,
the triggering device transmits, after transmission of the trigger signal, a continuous carrier that consecutively follows the trigger signal,
each of the transceivers has a variable receiver sensitivity and a correction value according to the receiver sensitivity,
in response to receipt of the trigger signal, each of the transceivers changes the receiver sensitivity thereof from a highest value to a lowest value in a plurality of stages, and determines the one of the stages from which it becomes impossible for the transceiver to detect the continuous carrier,
each of the transceivers further determines a parameter, which is indicative of the determined stage, corrects the determined parameter using the correction value, determines a transmission time according to the corrected parameter, and transmits the response signal at the determined transmission time,
the receiver receives the response signals transmitted by the transceivers at different reception times, and
the wheel identifier identifies, for each of the response signals received by the receiver, the wheel on which the transceiver having transmitted the response signal is located based on the reception time at which the response signal is received by the receiver.

14. The wheel identifying apparatus as set forth in claim 13, wherein each of the transceivers makes a detection of the continuous carrier at each stage of the change in the receiver sensitivity thereof, and determines the parameter which is the number of times the continuous carrier is detected by the transceiver during the change in the receiver sensitivity.

15. The wheel identifying apparatus as set forth in claim 13, wherein the receiver and the wheel identifier are located on the body of the vehicle and integrated into a single device.

16. A tire inflation pressure detecting apparatus comprising:
a first and a second pressure sensor which are respectively located on a first and a second wheel of a vehicle, each of the pressure sensors working to sense inflation pressure of an associated one of tires fitted on the first and second wheels and output tire pressure information indicative of the sensed inflation pressure of the associated tire;
a first and a second transceiver which are respectively located on the first and second wheels of the vehicle, each of the transceivers working to receive a trigger signal and transmit a response signal, which conveys the tire pressure information outputted by an associated one of the first and second pressure sensors, in response to receipt of the trigger signal;
a triggering device working to transmit the trigger signal, the triggering device being located on a body of the vehicle at different distances from the transceivers, so that strengths of the trigger signal at the transceivers are different from each other;
a receiver working to receive the response signals transmitted by the transceivers;
a wheel identifier operatively connected to the receiver, the wheel identifier working to identify, for each of the response signals received by the receiver, the wheel on which the transceiver having transmitted the response signal is located; and
a tire pressure determiner operatively connected to the receiver and the wheel identifier, the tire pressure determiner working to determine, for each of the response signals received by the receiver, the inflation pressure of the tire that is located on the same wheel as the transceiver having transmitted the response signal based on the tire pressure information conveyed by the response signal,
wherein,
the triggering device transmits, after transmission of the trigger signal, a continuous carrier that consecutively follows the trigger signal,
each of the transceivers has a variable receiver sensitivity and a correction value according to the receiver sensitivity,
in response to receipt of the trigger signal, each of the transceivers changes the receiver sensitivity thereof from a highest value to a lowest value in a plurality of stages, and determines the one of the stages from which it becomes impossible for the transceiver to detect the continuous carrier,
each of the transceivers further determines a parameter, which is indicative of the determined stage, corrects the determined parameter using the correction value, determines a transmission time according to the corrected parameter, and transmits the response signal at the determined transmission time,
the receiver receives the response signals transmitted by the transceivers at different reception times, and
the wheel identifier identifies, for each of the response signals received by the receiver, the wheel on which the transceiver having transmitted the response signal is located based on the reception time at which the response signal is received by the receiver.

17. The tire inflation pressure detecting apparatus as set forth in claim 16, wherein the first and second pressure sensors are respectively integrated into the first and second transceivers, and the receiver, the wheel identifier, and the tire pressure determiner are located on the body of the vehicle and integrated into a single device.

18. A wheel identifying apparatus comprising:
a first and a second transceiver which are respectively located on a first and a second wheel of a vehicle, each of the transceivers working to receive a trigger signal and transmit a response signal in response to receipt of the trigger signal;
a triggering device working to transmit the trigger signal, the triggering device being located on a body of the vehicle at different distances from the transceivers, so that strengths of the trigger signal at the transceivers are different from each other;
a receiver working to receive the response signals transmitted by the transceivers; and
a wheel identifier operatively connected to the receiver, the wheel identifier working to identify, for each of the response signals received by the receiver, the wheel on which the transceiver having transmitted the response signal is located,
wherein,
the triggering device transmits, after transmission of the trigger signal, a continuous carrier that consecutively follows the trigger signal,
each of the transceivers has a variable receiver sensitivity and a correction value according to the receiver sensitivity,
in response to receipt of the trigger signal, each of the transceivers changes the receiver sensitivity thereof from a highest value to a lowest value in a plurality of stages, and determines the one of the stages from which it becomes impossible for the transceiver to detect the continuous carrier,
each of the transceivers further determines a parameter, which is indicative of the determined stage, corrects the determined parameter using the correction value, and transmits the response signal which conveys data representing the corrected parameter, and
the wheel identifier identifies, for each of the response signals received by the receiver, the wheel on which the transceiver having transmitted the response signal is located based on the data conveyed by the response signal.

19. The wheel identifying apparatus as set forth in claim 18, wherein each of the transceivers makes a detection of the continuous carrier at each stage of the change in the receiver sensitivity thereof, and determines the parameter which is the number of times the continuous carrier is detected by the transceiver during the change in the receiver sensitivity.

20. The wheel identifying apparatus as set forth in claim 18, wherein the receiver and the wheel identifier are located on the body of the vehicle and integrated into a single device.

21. A tire inflation pressure detecting apparatus comprising:
a first and a second pressure sensor which are respectively located on a first and a second wheel of a vehicle, each of the pressure sensors working to sense inflation pressure of an associated one of tires fitted on the first and second wheels and output tire pressure information indicative of the sensed inflation pressure of the associated tire;
a first and a second transceiver which are respectively located on the first and second wheels of the vehicle, each of the transceivers working to receive a trigger signal and transmit a response signal, which conveys the tire pressure information outputted by an associated one of the first and second pressure sensors, in response to receipt of the trigger signal;
a triggering device working to transmit the trigger signal, the triggering device being located on a body of the vehicle at different distances from the transceivers, so that strengths of the trigger signal at the transceivers are different from each other;
a receiver working to receive the response signals transmitted by the transceivers;
a wheel identifier operatively connected to the receiver, the wheel identifier working to identify, for each of the response signals received by the receiver, the wheel on which the transceiver having transmitted the response signal is located; and
a tire pressure determiner operatively connected to the receiver and the wheel identifier, the tire pressure determiner working to determine, for each of the response signals received by the receiver, the inflation pressure of the tire that is located on the same wheel as the transceiver having transmitted the response signal based on the tire pressure information conveyed by the response signal,
wherein,
the triggering device transmits, after transmission of the trigger signal, a continuous carrier that consecutively follows the trigger signal,
each of the transceivers has a variable receiver sensitivity and a correction value according to the receiver sensitivity,
in response to receipt of the trigger signal, each of the transceivers changes the receiver sensitivity thereof from a highest value to a lowest value in a plurality of stages, and determines the one of the stages from which it becomes impossible for the transceiver to detect the continuous carrier,
each of the transceivers further determines a parameter, which is indicative of the determined stage, corrects the determined parameter using the correction value, and transmits the response signal which conveys data representing the corrected parameter along with the tire pressure information, and
the wheel identifier identifies, for each of the response signals received by the receiver, the wheel on which the transceiver having transmitted the response signal is located based on the data conveyed by the response signal.

22. The tire inflation pressure detecting apparatus as set forth in claim 21, wherein the first and second pressure sensors are respectively integrated into the first and second transceivers, and the receiver, the wheel identifier, and the tire pressure determiner are located on the body of the vehicle and integrated into a single device.

* * * * *